(12) United States Patent
Lee et al.

(10) Patent No.: US 10,466,090 B2
(45) Date of Patent: Nov. 5, 2019

(54) CAPACITIVE FLUID LEVEL SENSOR FOR RAPID RESPONSE

(71) Applicant: KSR IP Holdings, LLC, Wilmington, DE (US)

(72) Inventors: Joong K. Lee, Chatham (CA); Ryan W. Elliott, Chatham (CA)

(73) Assignee: KSR IP Holdings, LLC, Wilmington, DE (US)

( * ) Notice: Subject to any disclaimer, the term of this patent is extended or adjusted under 35 U.S.C. 154(b) by 120 days.

(21) Appl. No.: 15/679,628

(22) Filed: Aug. 17, 2017

(65) Prior Publication Data

US 2018/0052031 A1    Feb. 22, 2018

Related U.S. Application Data

(60) Provisional application No. 62/376,186, filed on Aug. 17, 2016.

(51) Int. Cl.
*G01F 23/26* (2006.01)
*G01F 23/00* (2006.01)

(52) U.S. Cl.
CPC ........ *G01F 23/266* (2013.01); *G01F 23/0061* (2013.01); *G01F 23/26* (2013.01); *G01F 23/268* (2013.01)

(58) Field of Classification Search
CPC ............. G01F 23/0061; G01F 23/0069; G01F 23/0084; G01F 23/243; G01F 23/244; G01F 23/26; G01F 23/263; G01F 23/266
See application file for complete search history.

(56) References Cited

U.S. PATENT DOCUMENTS

| 3,115,603 | A |   | 12/1963 | Fluegel |                |
|-----------|---|---|---------|---------|----------------|
| 3,534,606 | A | * | 10/1970 | Stamler | G01F 23/263    |
|           |   |   |         |         | 73/304 C       |
| 3,901,079 | A | * | 8/1975  | Vogel   | G01F 23/263    |
|           |   |   |         |         | 73/304 C       |
| 4,149,231 | A | * | 4/1979  | Bukosky | G01F 23/266    |
|           |   |   |         |         | 324/678        |

(Continued)

OTHER PUBLICATIONS

International Search Report dated Nov. 27, 2017 (2 pages) by International Searching Authority.

*Primary Examiner* — Justin N Olamit
(74) *Attorney, Agent, or Firm* — Dinsmore & Shohl LLP

(57) ABSTRACT

The present current steering bridge may be used as a sensor for detecting a level of fluid within a single reservoir or multiple reservoirs. The sensor is a modified LC oscillator with a four-megahertz exciting signal creating a low impedance output and has ratio-metric processing capabilities. Because of the low impedance output, a high signal to noise ratio is achievable. This high signal to noise ratio enables accurate measurement of small changes of liquid level. Further, ratio-metric processing permits the analysis of the ratio of current reference to signal output. As such, this arrangement provides an output that is independent of temperature, EMC, aging and other environmental noises. Further, the sensor references the existing environment, and is fluid independent within a specified range of dielectric constant. As such, feedback can compensate for dielectric constant changes of the liquid, allowing the same sensor to work in different liquids.

19 Claims, 20 Drawing Sheets

(56) References Cited

U.S. PATENT DOCUMENTS

| | | | | |
|---|---|---|---|---|
| 4,232,300 A | * | 11/1980 | Wright | G01F 23/241 |
| | | | | 340/870.11 |
| 4,418,569 A | * | 12/1983 | Kuhnel | G01F 23/266 |
| | | | | 324/678 |
| 5,750,903 A | | 5/1998 | Ryhanen | |
| 2016/0047683 A1 | | 2/2016 | Winkens et al. | |

* cited by examiner

CAPACITIVE FLUID LEVEL SENSOR FOR RAPID RESPONSE

CROSS-REFERENCE TO RELATED APPLICATIONS

The present utility patent application claims priority benefit of the U.S. provisional application for patent Ser. No. 62/376,186, filed on Aug. 17, 2016, under 35 U.S.C. 119(e).

FIELD OF THE INVENTION

The present invention relates to electronic circuits and systems. More specifically, the present invention relates to capacitive sensing circuit for use in fluid detection applications.

BACKGROUND OF THE INVENTION

Among the many types of the fluid level sensors for automotive applications, a capacitive level sensor is one of the simplest sensors considering its shape and size. Other sensors require a float mechanism, or series of switches, which change states based upon whether the fluid level increases or decreases. Capacitive sensors do not require the float mechanism or the series of small switches, but instead use simple implementation of printed pattern of electrodes on a typical PCB (printed circuit board), so that the design and implementation is simple and compact. Capacitive based fluid sensors are based upon the change in the capacitance within a given dielectric. As fluid levels change along the generally vertical electrodes of capacitive plates of the sensor, the amount of the capacitance increases or decreases in the sensor's capacitors. That amount of capacitance is now proportional to the level of the fluid Capacitive based fluid sensors have a practical application in the automotive industry such as within engines, transmissions, gear boxes, and fuel tanks. Essentially, anywhere there is a need to determine a fluid level within a given component or a machine. Because of the capacitive properties of these sensors, they provide real time data to a user or a processing chip.

Traditional capacitive based fluid level sensors that are in contact/submerged in oil have several issues despite the simplest design and the applications. First, the traditional capacitive fluid level sensor cannot measure the same level of the fluid when the fluid has been changed from one fluid to another fluid because those fluids can have a different dielectric constant that defines the capacitance so that the capacitance is proportional to the level. Further, as the choice of the fluid is up to the user, the dielectric constant that depends on the user's choice of the fluid. Another issue is that as the temperature of a dielectric changes so does the value of the dielectric constant. Many of the existing traditional designs of the capacitive level sensor cannot account for the value change in the dielectric constant, for temperature swings, or for when the user chooses any type of the engine oils ranging from a typical mineral oil to a synthetic oil, which may differ from two to four in the relative dielectric constant.

Further, other issues for the traditional capacitive based fluid level sensors that is in contact/submerged in oil are that, over time, the value of the dielectric constant and the resistivity of the fluid in general changes due to deterioration as a result from an accumulation of metal debris, black carbon, or acidification of the engine oil due to the intrusion of the chemicals of burned fuel from the engine. Moreover, traditional capacitive based fluid sensors are not able to compensate for foreign contaminants that alter the value of the dielectric constant in other automotive application like a windshield wash fluid level sensing due to harsh environment of the under-the-hood.

Traditional capacitive sensors have a high noise floor, more than any other type of the implementation, because the source impedance of the capacitive sensor is very high so that the EMC (electromagnetic compatibility) design is very difficult. Therefore, the incoming noise cannot be easily drained due to the high source impedance. As such, a high source impedance results in the output of the sensor having a high level of noise, which becomes unstable. For example, the impedance of a single capacitor powered by a DC power source has essentially infinity as its impedance. As a result, the frequency is traditionally driven at frequencies in the range of 10 kHz.

Accordingly, it is desirable to have a sensor that can compensate for these changes in the value of the dielectric constant, have the versatility of using a sensor driven by a high RF frequency and provide an accurate fluid level measurement.

SUMMARY OF THE INVENTION

In one embodiment, a system for determining a level of fluid in a reservoir is provided. The system includes a processor chip, a circuit board, a sensing board, a first differential voltage source, a first current steering bridge, and a first voltage divider. The circuit board is communicatively coupled to the processor chip. The sensing board coupled to the circuit board. The first differential voltage source includes a first pair of voltage sources. The first current steering bridge includes a first pair of bridging passive elements that are configured to generate a first differential signal. The first differential voltage source is coupled in series with the first current steering bridge. The first voltage divider is coupled between the first pair of bridging passive elements. The first voltage divider is coupled in parallel with the first current steering bridge. The first voltage divider configured to process the first differential signal to a processor chip. The first differential signal is a measurement that corresponds to the level of fluid in contact with the first current steering bridge.

In another embodiment, a system for determining a level of fluid in a reservoir is provided. The system includes a processor chip, a circuit board, a sensing board, a differential voltage source, a first current steering bridge, and a first voltage divider, a second current steering bridge, and a second voltage divider. The circuit board is communicatively coupled to the processor chip. The sensing board coupled to the circuit board. The differential voltage source includes a pair of voltage sources. The first current steering bridge includes a first pair of bridging passive elements that are configured to generate a first differential signal. The second current steering bridge includes a second pair of bridging passive elements to generate a second differential signal. The first current steering bridge is coupled in series with the second current steering bridge. The differential voltage source is coupled in parallel with the first current steering bridge and the second current steering bridge. The first voltage divider is coupled between the first pair of bridging passive elements. The first voltage divider is coupled in parallel with the first current steering bridge. The first voltage divider is configured to process the first differential signal to the processor chip. The second voltage divider is coupled between the second pair of bridging passive elements. The second voltage divider is coupled in parallel with the second current steering bridge. The second voltage divider is configured to process the second differential signal to the processor chip. The at least one of the first pair of bridging passive elements and the at least one of the second pair of bridging passive elements are in communication with the sensing board. The sensing board is in fluid communication with the fluid. The first differential signal is a measurement that corresponds to the level of fluid in contact with the first current steering bridge and the second differential signal is a measurement that corresponds to a reference value. The first differential signal and the second differential signal provide a ratio-metric output. The ratio-metric output is independent from a fluid type, a temperature, an electromagnetic interference, and common mode noise.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

The present current steering bridge may be used as a sensor for detecting a level of fluid within a single reservoir or multiple reservoirs. The sensor is a modified LC oscillator with a four-megahertz exciting signal creating a low impedance output and has ratio-metric processing capabilities. Because of the low impedance output, a high signal to noise ratio is achievable. This high signal to noise ratio enables accurate measurement of small changes of liquid level. Further, ratio-metric processing permits the analysis of the ratio of current reference to signal output. As such, this arrangement provides an output that is independent of temperature, EMC, aging and other environmental noises. Further, the sensor references the existing environment, and is fluid independent within a specified range of dielectric constant. As such, feedback can compensate for dielectric constant changes of the liquid, allowing the same sensor to work in different liquids.

Figure 1A:
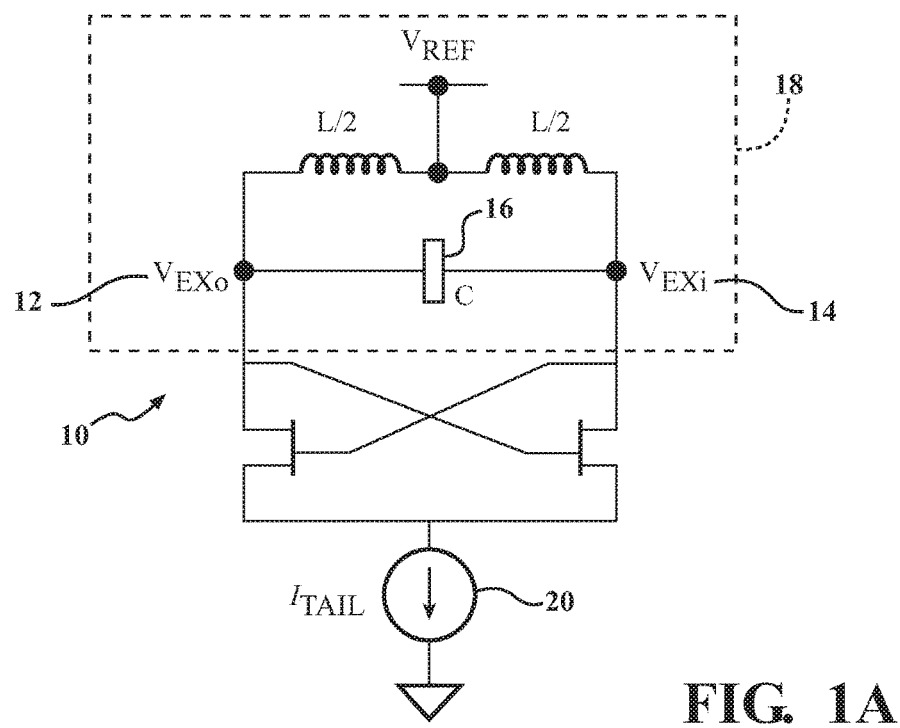
FIG. 1A schematically depicts a circuit diagram of a pair of opposite phase voltage sources realized by differential LC oscillator, according to one or more embodiments shown and described herein.

Given the above, and referring to the attached illustrations, FIG. 1A schematically depicts a circuit 10 having a pair of opposite phase voltage sources supplied to the LC circuit and ultimately a processor chip, such being referenced subsequently by general example at 74 (FIG. 4B) and including in one variant an inductive sensor chip and which are known to provide superior robustness and life cycle in comparison to magnetic sensors when applied to numerous vehicle applications including linear/rotary pedal position, fuel levels, and the like. Although not shown, existing current inductive sensors can further include a miniaturized processor chip or PC board, upon which are situated signal processing components, with the inductive signal input function including such as an aluminum rotor supported over an arrangement of transmitting and receiving coils.

A pair of variable capacitors associated with the chip can further include spatially arrayed plates, which are submerged within the fluid (e.g. oil) medium in order to provide a fluid level readout according to the teachings of the present invention. The circuit 10 in FIG. 1A further depicts a pair of excitation voltage sources of opposite phase, at 12 and 14, which are positioned on opposite sides of capacitor 16 associated with an LC resonator of an inductive sensor driving circuit, see at 18, the output of which is supplied through a galvanometer 20 as a trace current (typically under 1 mA) for subsequent conversion to a changing voltage output.

Figure 1B:
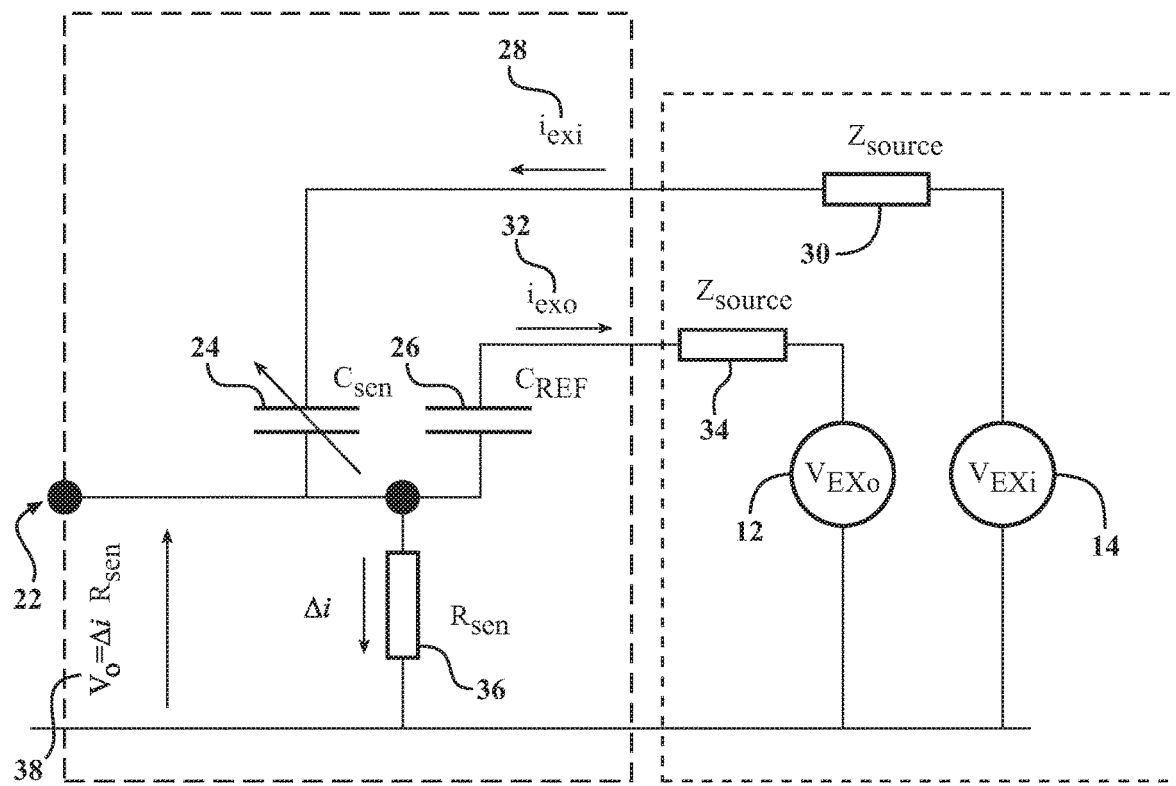
FIG. 1B schematically depicts a circuit diagram of a current steering bridge circuit with bias voltage in which the sensor capacitors are connected to the opposite phase voltage sources, according to one or more embodiments shown and described herein.

FIG. 1B is a schematic depiction of a current steering bridge circuit 22 with bias voltage in which a pair of sensor capacitors, see variable capacitor $C_{sen}$ at 24 and capacitor $C_{REF}$ 26, are connected to the opposite phase voltage sources 12 and 14, the magnitude of these being the same for all driving frequencies, such as including a non-limiting range of from several hundred kHz to a few tens of MHz. In this arrangement, the variable capacitor 24 becomes a current source pumping a certain amount of excitation current, see at 28, through resistor 30, with the other capacitor 26 generating excitation current 32 through resistor 34.

Figure 1C:
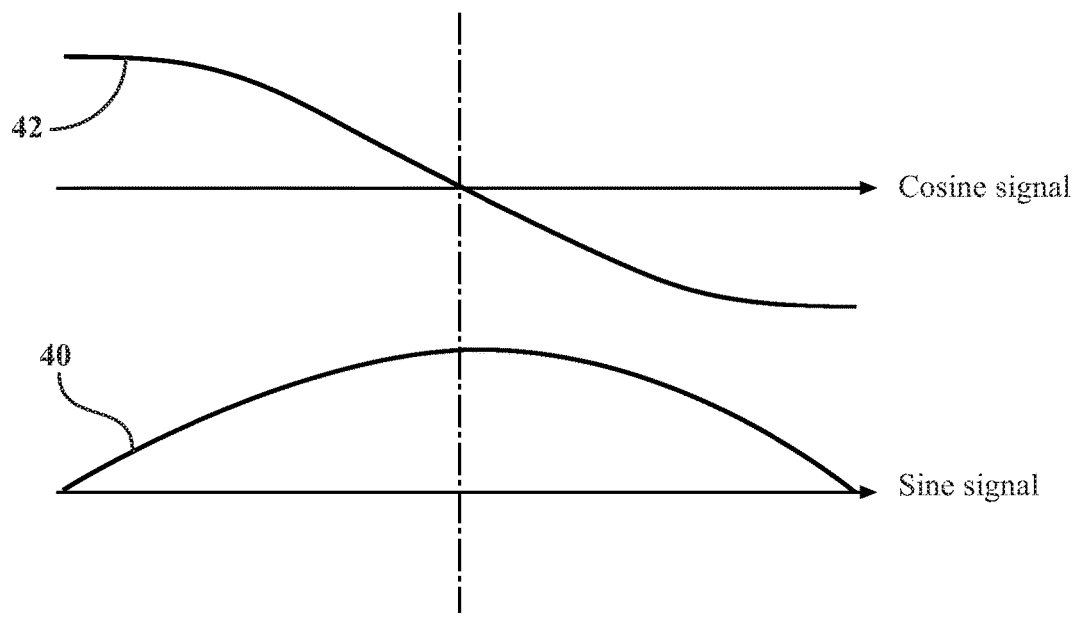
FIG. 1C schematically depicts a pair of sine and cosine signal depictions derived from a pair of current steering bridge circuits for use with a signal processor also applicable to inductive sensor applications, according to one or more embodiments shown and described herein.

The current steering bridge circuit structure operates to steer the currents generated in opposite phases with differential amount between the capacitors, the resultant sensing current, see at 36 and which corresponds to a differential current, appears as a voltage 38 through the resistor 36. FIG. 1C provides a pair of sine 40 and cosine 42 signal depictions derived from a pair of current steering bridge circuits such as depicted in FIG. 1B for use with a signal processor chip also applicable to inductive sensor applications.

Figure 2:
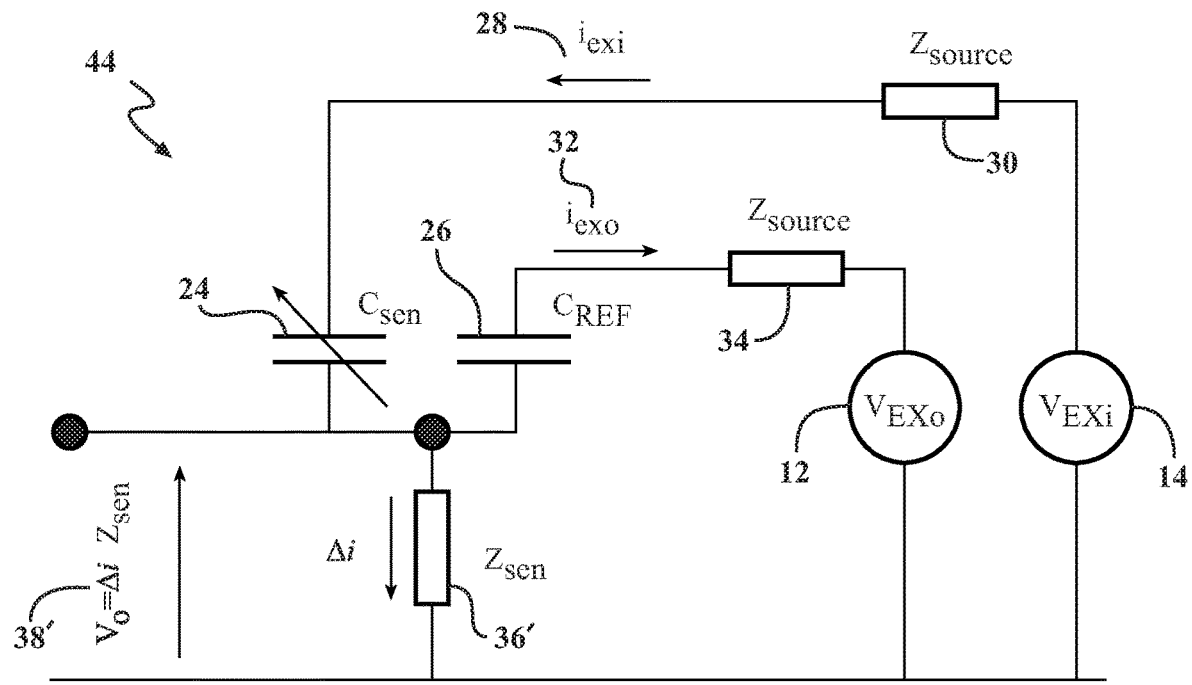
FIG. 2 schematically depicts a circuit diagram of a capacitance current steering bridge circuit with source voltage equal to zero and which instructs that the output voltage is proportional to the differential capacitance around zero, according to one or more embodiments shown and described herein.

FIG. 2 schematically illustrates the capacitance current steering bridge circuit of FIG. 1B. As further generally depicted at 44 a source voltage set equal to zero instructs that the output voltage, see at depicted at 38', as being proportional to a differential capacitance 36' at approximately a zero reading.

Figure 3A:
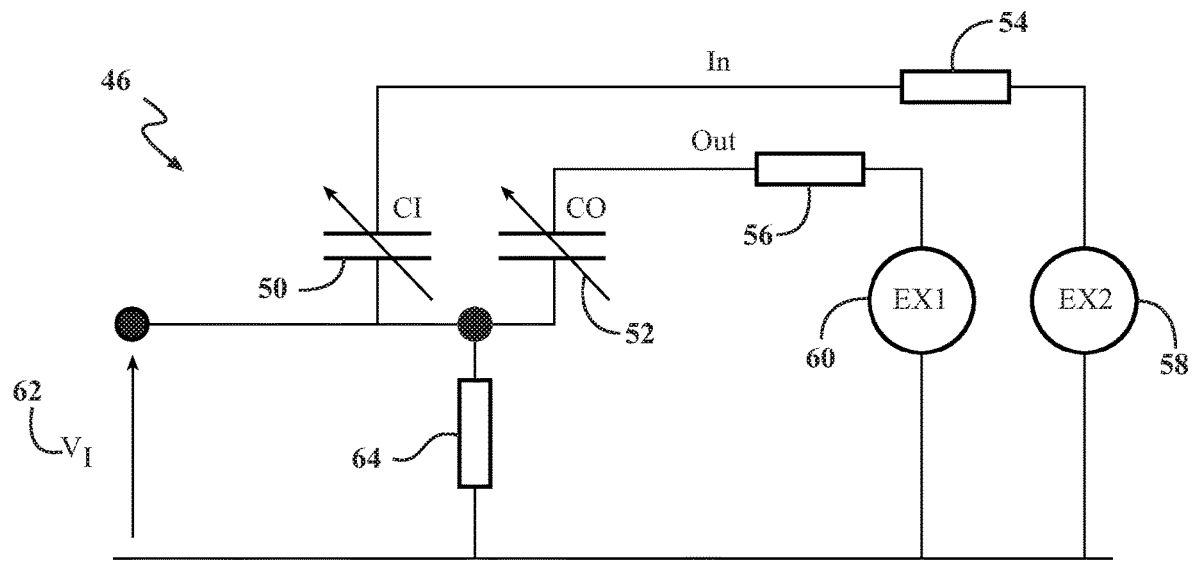
FIG. 3A schematically depicts a circuit diagram of an I phase of a capacitive voltage divider circuit relating to the fluid level detection principles according to the present invention, according to one or more embodiments shown and described herein.
Figure 3B:
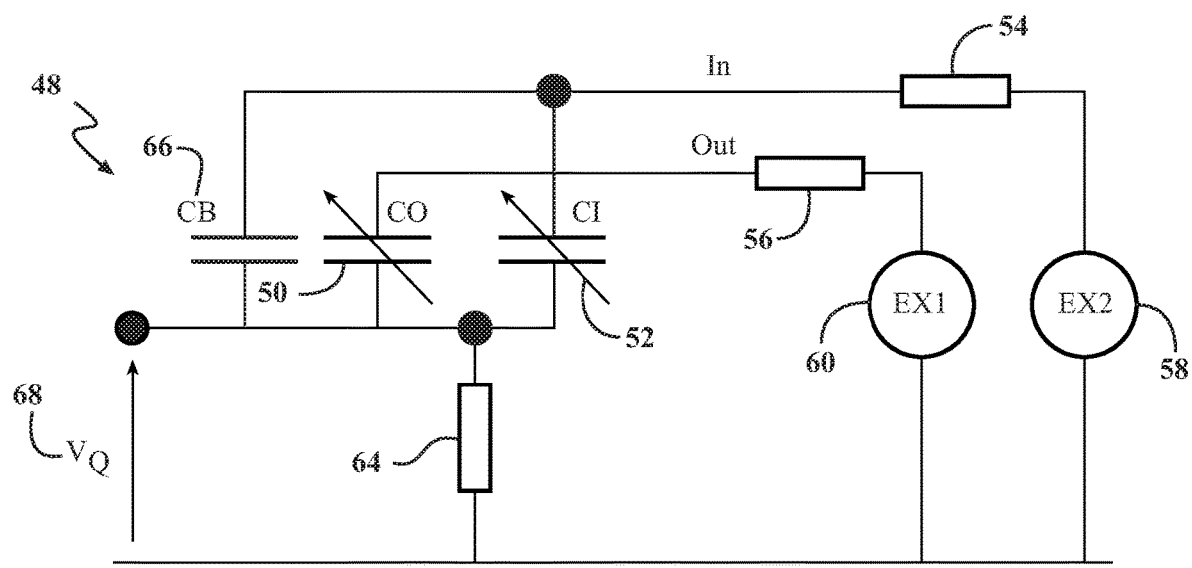
FIG. 3B schematically depicts a circuit diagram of a Q phase of a capacitive voltage divider circuit relating to the fluid level detection principles according to the present invention, according to one or more embodiments shown and described herein.

FIGS. 3A and 3B schematically provide I phase 46 and Q phase 48 depictions of a capacitive voltage divider circuit relating to the fluid level detection principles according to the present invention (corresponding to quadrature signal generation by the pair of out of phase voltage sources, with the signals detected representing the differential of the voltages). Referring first to FIG. 3A, the pair of variable capacitors, further defined at 50 and 52 respectively, are driven by the opposite phase voltage sources, further at 58 and 60, fed through resistors 54 and 56, and further such that voltage 62 derived from resistor 64 begins to increase and reaches a maximum value at a center of the phase curve (see also sine depiction 40 in FIG. 1C) with subsequent decrease after the midpoint such that the voltage 62 ($V_I$) represents the sine signal.

With further reference to the Q phase depiction 48 of FIG. 3B, increase in fluid level corresponds with the initial voltage being fed across a derived base capacitor 66 (in parallel with variable capacitor 52), the voltage (see at 68) decreases and becomes zero at the midpoint (see again cosine depiction 42), and which then decreases out of phase thereafter, the voltage 68 ($V_Q$) representing the cosine signal. In this arrangement, the capacitor 66 represents the maximum differential capacitance of the sensor (variable) capacitors 50 and 52.

Figure 4A:
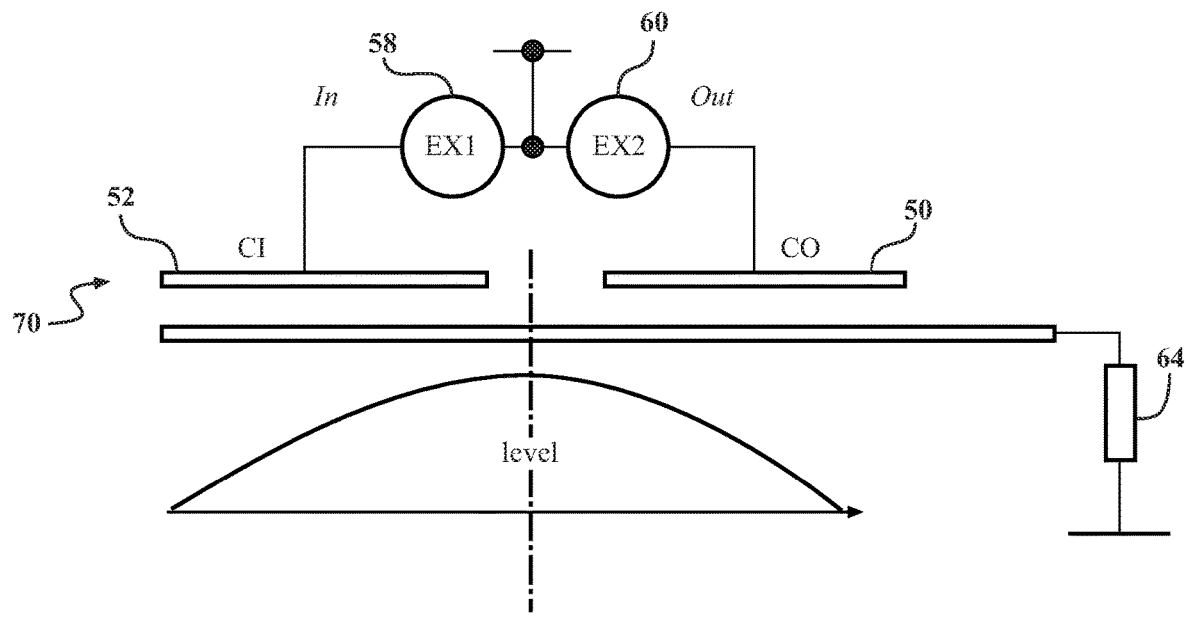
FIG. 4A schematically depicts a circuit diagram of a successive I phase implementation of the voltage-capacitor sensor assembly and in which the base capacitor for a Q phase signal can be any of a chip capacitor or a submerged PC board capacitor, according to one or more embodiments shown and described herein.
Figure 4B:
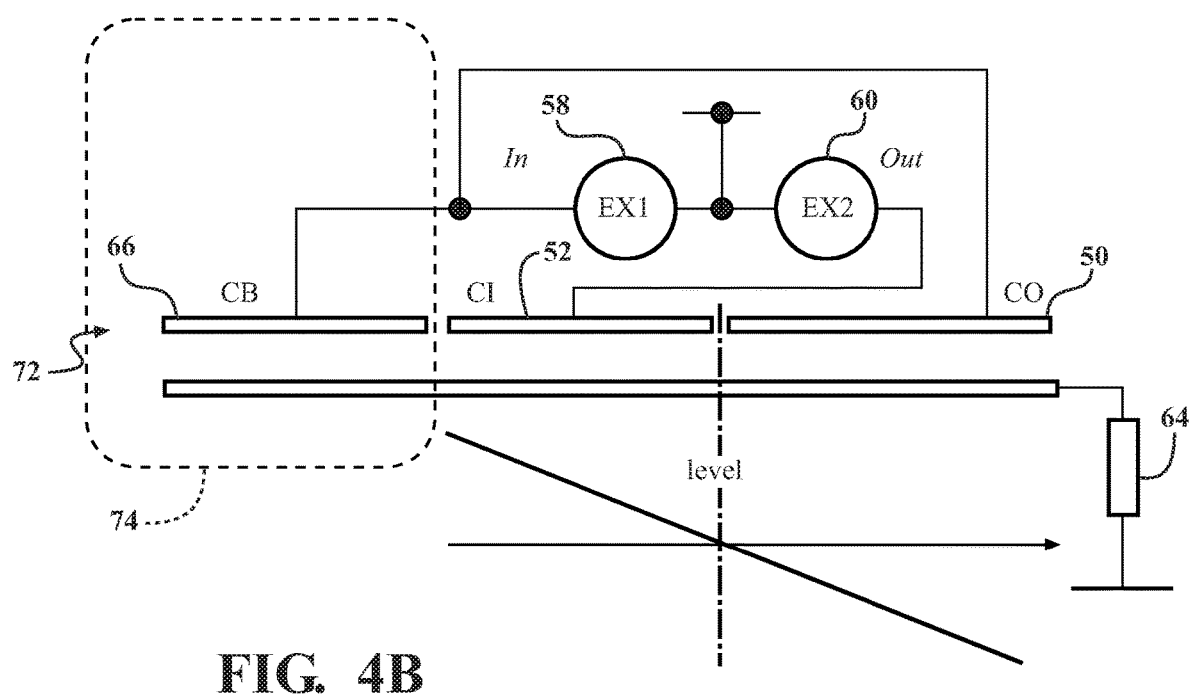
FIG. 4B schematically depicts a circuit diagram of a Q phase implementation of the voltage-capacitor sensor assembly and in which the base capacitor for a Q phase signal can be any of a chip capacitor or a submerged PC board capacitor, according to one or more embodiments shown and described herein.
Figure 5A:
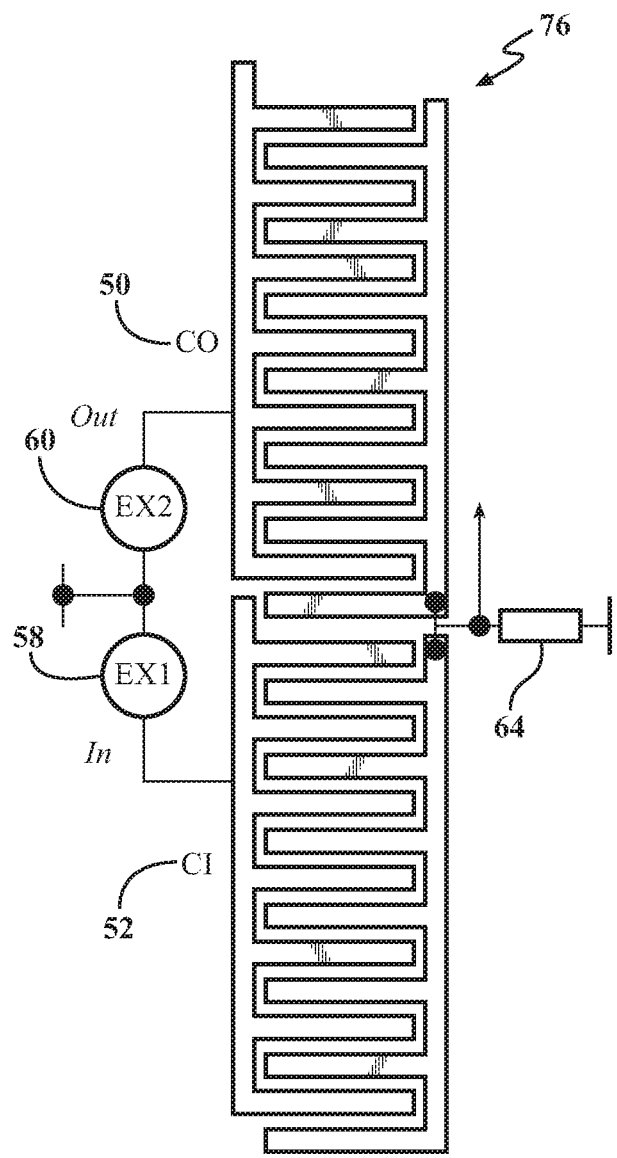
FIG. 5A schematically depicts an I phase on $1^{st}$ layer of variable capacitors which are integrated into the associated processor chip for required quadrature signal generation, according to one or more embodiments shown and described herein.
Figure 5B:
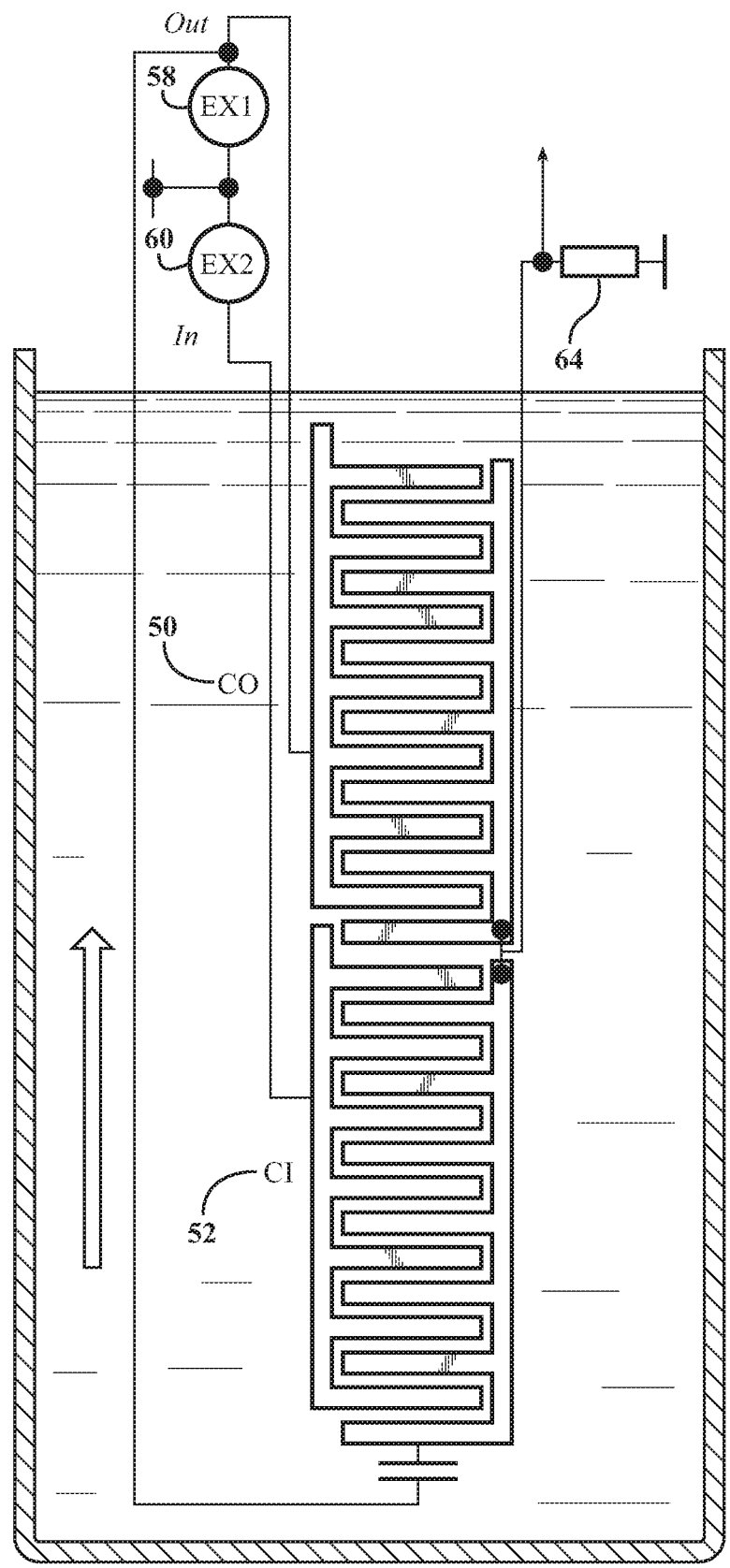
FIG. 5B schematically depicts a Q phase on $2^{nd}$ layer of variable capacitors which are integrated into the associated processor chip for required quadrature signal generation, according to one or more embodiments shown and described herein.

FIGS. 4A and 4B schematically illustrate successive I phase and Q phase implementation physical layout depictions, see generally at 70 and 72, of the voltage-capacitor sensor assembly as generally described in the capacitive voltage divider phase circuits 46 and 48 of FIGS. 3A and 3B, and in which the base capacitor for a Q phase signal can be any of a chip capacitor (such as at a 5 pF range) or a submerged PC board capacitor, as further depicted in shaded phantom at 74 in FIG. 4B and which is understood to be submerged in the oil reservoir or other fluid container such as, without limitation, in FIG. 5B. As previously described, the physical layer can be as shown for generating a quadrature signal. The base capacitor 66 for the Q phase signal can also be of the same type as the capacitors CI 52 and CO 50.

FIGS. 5A and 5B further respectively schematically depict, generally each of an I phase on $1^{st}$ layer (at 76) and Q phase on $2^{nd}$ layer (at 78) of the variable capacitors 50/52, and which are integrated into the associated processor chip 74 for required quadrature signal generation. As previously described by one non-limiting example, a maximum differential capacitance for each signal can be set around 5 pF (pico farads) or more and the base capacitor (CB) can represent the maximum differential capacitance. It is further understood that the layouts depicted represent only one possible example of the capacitance plate structure, such also envisioning simple strips provided for each electrode in order to minimize in-plane capacitance as compared to out-of-plane capacitance.

Figure 6:
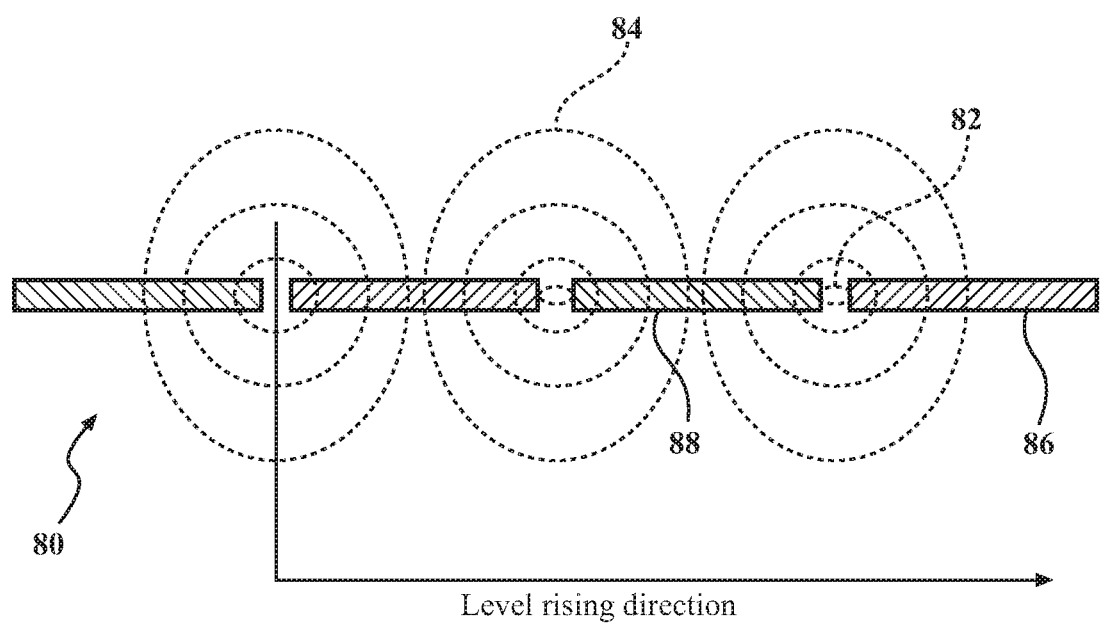
FIG. 6 schematically depicts aa sectional illustration of inter-digital electrode capacitance forming with electric field lines, according to one or more embodiments shown and described herein.

FIG. 6 is a schematic sectional illustration, generally at 80, of an inter-digital electrode capacitance forming with electric field lines (see both in-field 82 and out-of-field 84) arrayed between ground fingers 86 and alternating capacitor fingers 88, such assisting in preventing an oil fluid within which the associated processor is submerged from sticking between the thickness of the capacitor plates, thereby improving sensing speed and associated response time. Major viscous forces result in the gaps established and where the in-field lines 82 exist in relatively high density, it being further understood that when the narrow gaps are filled with an epoxy like coating, the region will not response with the oil interaction, this further assisting in reduction of signaling error.

As further supported by the above illustrations, a feedback loop with LC circuit is applied to the received voltages 12/14 for maintaining a constant value in order to compensate for the aging/acidization changes in the dielectric constants associated with the target fluid (e.g. oil), it being further understood that the difficulty in fluid capacitance measurement is in large part due to such changes in the dielectric constant of the fluid resulting from its aging/acidization. The feedback loop on the received voltages maintains a constant value based on an established function, with the excitation voltages 12/14 being varied to maintain constant the input signal(s).

Additional changes in correcting feedback loop can include utilizing a sampling mechanism that exhibits greater resolution than required to allow the input signal to be reduced while still maintaining an output resolution as the excitation voltage reaches its limits. Such controls can provide, in one non-limiting example, for a greater than factor or four range (4×) in the dielectric constant with a given fluid type.

Balancing a RF capacitor sensor associated with a dielectric constant is important in fluid applications. A balance of capacitors will define a null signal point, thus allowing a measuring of the fluid level regardless of the dielectric constant of the fluid. This is important for obvious reasons, such as the change in the dielectric constant due to temperature, thickness, breakdown of the fluid, etc. Balancing a capacitor pair requires the same amount of in capacitance ($Q_{IN}$) as out capacitance ($Q_{OUT}$) with a balanced voltage pair.

Figure 7A:
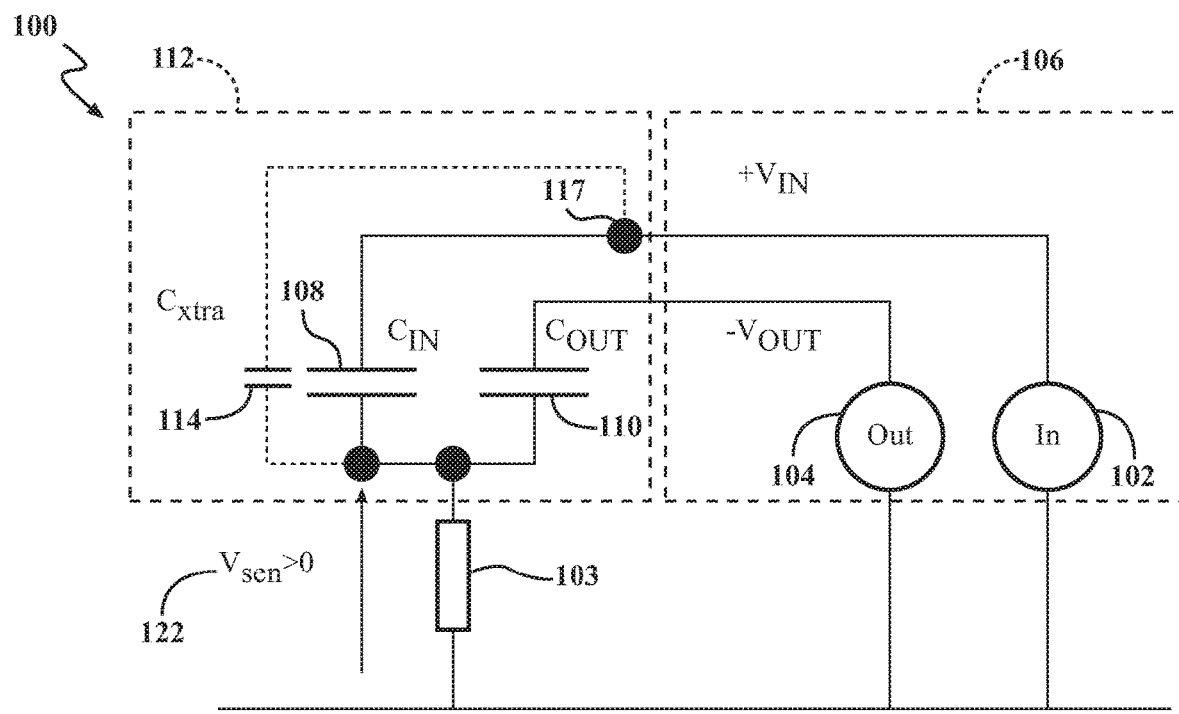
FIG. 7A schematically depicts a circuit diagram of an unbalanced capacitor pair with a balanced voltage pair of opposite phase voltage sources, according to one or more embodiments shown and described herein.

An unbalanced circuit, as shown in the circuit 100 in FIG. 7A schematically illustrates the voltage $V_{sen}$ 122 is greater than zero due to the geometry in control relay and capacitor plates. The circuit 100 in FIG. 7A further depicts a resister 103 and a pair of voltage sources of opposite phase, an in-phase voltage 102 and an out-phase voltage 104, the opposite phase voltage sources 102 and 104 thus create a balanced voltage pair 106 wherein $V_{IN}=-V_{OUT}$. Further depicted is a pair of capacitors, $C_{IN}$ 108 and $C_{OUT}$ 110 connected to the opposite phase voltage sources 102 and 104 and an additional control capacitor $C_{crtl1}$ 114 in parallel with capacitor $C_{IN}$ 108 and driven by the same phase voltage source 102, bonded at 117, thus having an unbalanced capacitor pair 112 wherein $V_{sen}$ 122 is greater than zero.

Figure 7B:
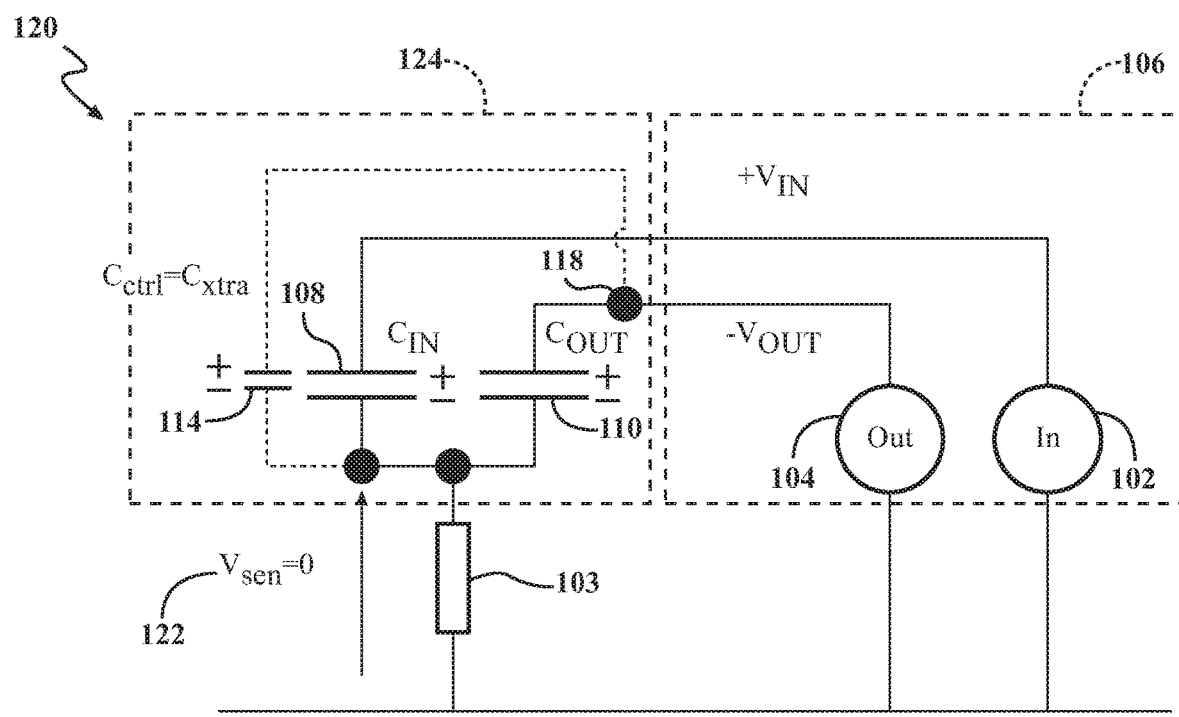
FIG. 7B schematically depicts a circuit diagram of a balanced capacitor pair with the insertion of a single control capacitor and with a balanced voltage pair of opposite phase voltage sources, according to one or more embodiments shown and described herein.

FIG. 7B is a schematic depiction, see generally at 120, of a balanced capacitor system 124 wherein $V_{sen}$ 122 is equal to zero. The circuit 120 in FIG. 7B further depicts a resister 103 and opposite phase voltage sources 102 and 104, the opposite phase voltage sources 102 and 104 thus create a balanced voltage pair 106. Further depicted is a balanced system 124 having a pair of capacitors, $C_{IN}$ 108 and $C_{out}$ 110 connected to the opposite phase voltage sources 102 and 104 and an additional control capacitor $C_{crtl1}$ 114 in parallel with capacitor $C_{IN}$ 108 but driven by an opposite phase voltage source 104, at bonded point 118. This allows a balancing of an unbalanced capacitor pair by a voltage pair. In other words, the control capacitance driven by the opposite branch is equal to the unbalanced portion of the capacitor pair. This can be depicted by the following equations:

$$C_{IN}V_{IN}+C_{ctrl1}V_{OUT}=C_{OUT}V_{OUT} \quad \text{Equation 1:}$$

$$(C_{IN}-C_{ctrl1})V_{IN}=C_{OUT}V_{OUT} \quad \text{Equation 2:}$$

A control capacitor may be added to circuit 122 using the above equations to balance a capacitor wherein $C_{IN}$ is greater than $C_{OUT}$. The same principle applies, by adding the control capacitor and wiring the control capacitor to the opposite branch of the voltage pair, $V_{sen}$ is equal to 0.

Figure 7C:
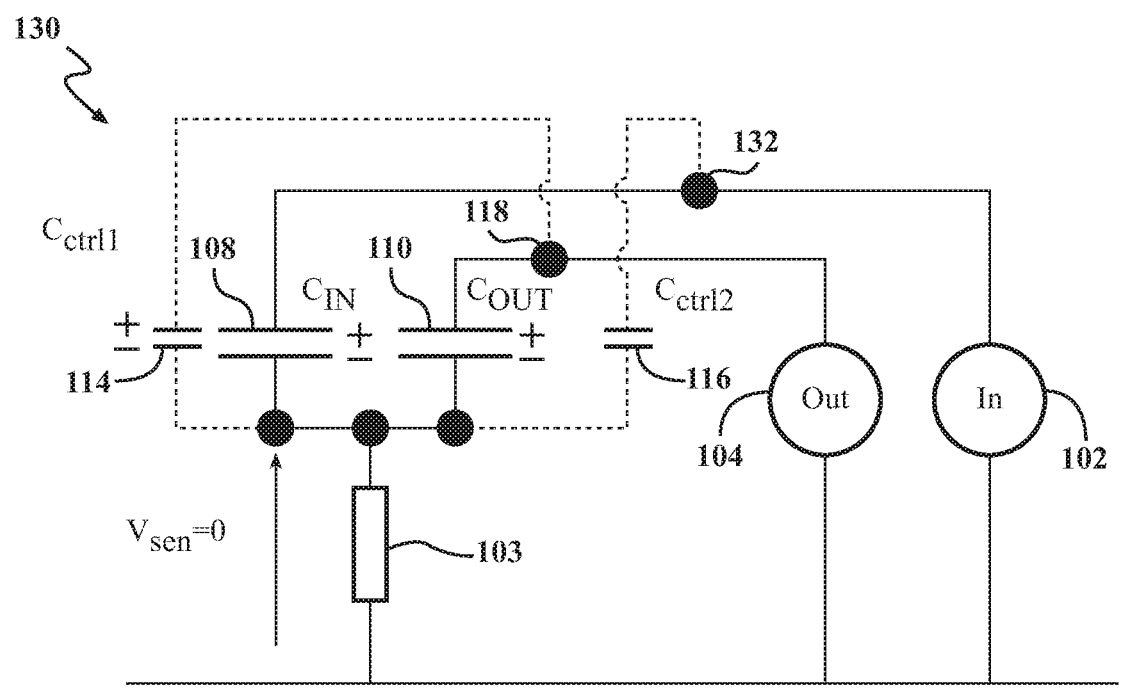
FIG. 7C schematically depicts a circuit diagram of a balanced capacitor pair with the insertion of two control capacitors and with a balanced voltage pair of opposite phase voltage sources, according to one or more embodiments shown and described herein.

However, by adding a single control capacitor, a parasitic unbalance may occur. To neutralize any parasitic losses, or stray capacitance, a second control capacitor may be added with any voltage pair. FIG. 7C illustrates the circuit 130 having an additional control capacitor $C_{ctrl2}$ 116 added in parallel with $C_{IN}$ 108 and similarly connected to the in-phase voltage 102, at bonding point 132. Balancing by inserting control capacitors can be depicted by the following equation:

$$C_{IN}V_{IN}+C_{ctrl1}V_{OUT}=C_{OUT}V_{OUT}+C_{ctrl2}V_{IN} \quad \text{Equation 3:}$$

In utilizing by definition that $V_{OUT}=-V_{IN}$, Equation 3 becomes:

$$(C_{IN}V_{IN}-C_{ctrl1})V_{IN}=(C_{OUT}V_{OUT}-C_{ctrl2})V_{OUT} \quad \text{Equation 4:}$$

It should be appreciated that $C_{ctrl2}$ may be added to any unbalanced capacitance such as the parasitic of wiring and connectors.

Figure 8:
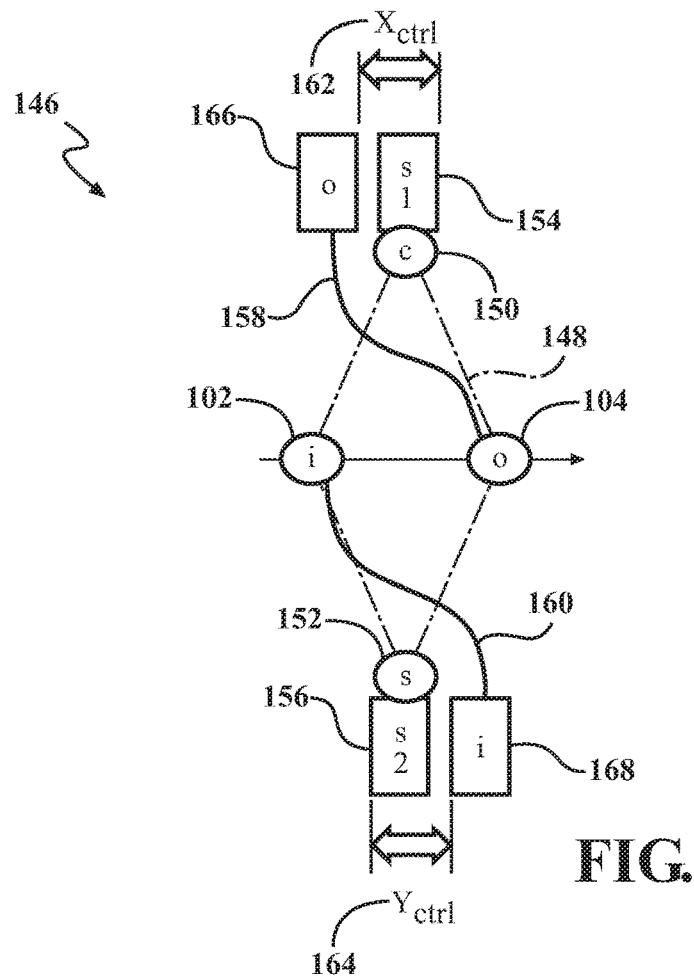
FIG. 8 schematically depicts a sensor layout having a rhombus design, according to one or more embodiments shown and described herein.

As schematically depicted in FIG. 8, the rhombus layout 148 (illustrated by a dash and dot line pattern) of the wires of the driver and the driver are shown. Further, FIG. 8 depicts a quadrature signal balancing layout having a cosine 150 and sine 152 capacitor pair driven by the voltage pair 102, 104; however, it should be appreciated that other signal balancing and other drivers may be used. Further yet, in this final assembly of the sensor 148, tuning pads 154, 156 may be necessary in order to balance the final system. The balancing mechanism can be by the same balancing mechanism as disused previously, namely, using sliding tuning capacitors 154, 156 wired to the opposite phase of the voltage pair 102, 104. Further, the overlapping or distance between the tuning pads forms the needed capacitance to balance the system as indicated by the distance $X_{crtl}$ 162 and $Y_{ctrl}$ 164 corresponding to the distance between the tuning pad 154, 156 and the voltage bonding 166, 168. In particular, in-phase power 102 is operatively connected to voltage bond 168 through wire 160 and is $Y_{crtl}$ distance from tuning pad 156. Likewise, out-phase power 104 is operatively connected to voltage bond 166 through wire 158 and is $X_{crtl}$ distance from tuning pad 154.

Figure 9:
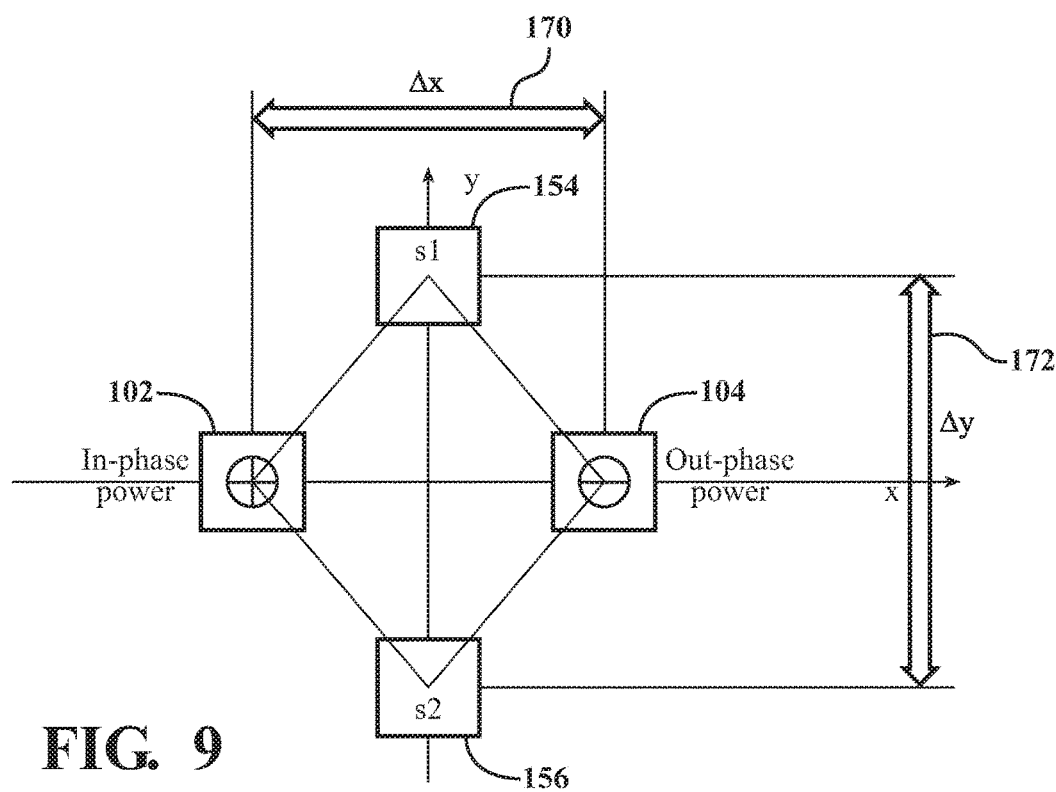
FIG. 9 schematically depicts a rhombus design layout parameters, according to one or more embodiments shown and described herein.

FIG. 9 schematically depicts that under the rhombus balancing neutralizing of wires, the distance between the two power lines 102, 104 should be closer than that of the signal lines 154, 156. It should be appreciated that coupling between a signal to any phased power line are the same as long as a rhombus can be drawn on the connecting wires as illustrated. When a rhombus can be formed, the neutralization of the wires is automatically met if the distance of ΔY 172≥ΔX 170; however the ΔY 172 distance between the signals 156, 154 should be as large as possible within a design limit. It should be appreciated that this rhombus design for any connector wire assembly functions to neutralize the wires regardless of IDF or quadrature sensor types. Further, the rhombus diagram maybe incorporated to a sensor PCB and connecting wire assembly to cancel out the electrical influences.

Now referring back to FIG. 8, parasitic losses of a balanced system may create unintended capacitance. As a result, parasitic losses may be controlled by using tuning pads 154, 154 at each signal driver 150, 156 respectively, and a rhombus diagram 148 (indicated by a dotted and dashed line) for a connector wire assembly. Calibrating the system can be used anywhere a capacitive unbalance exits. Further, a sensor plate unbalance may also be tuned in this method. Further yet, a connector pin and circuit unbalance can be done in the same way.

Figure 10:
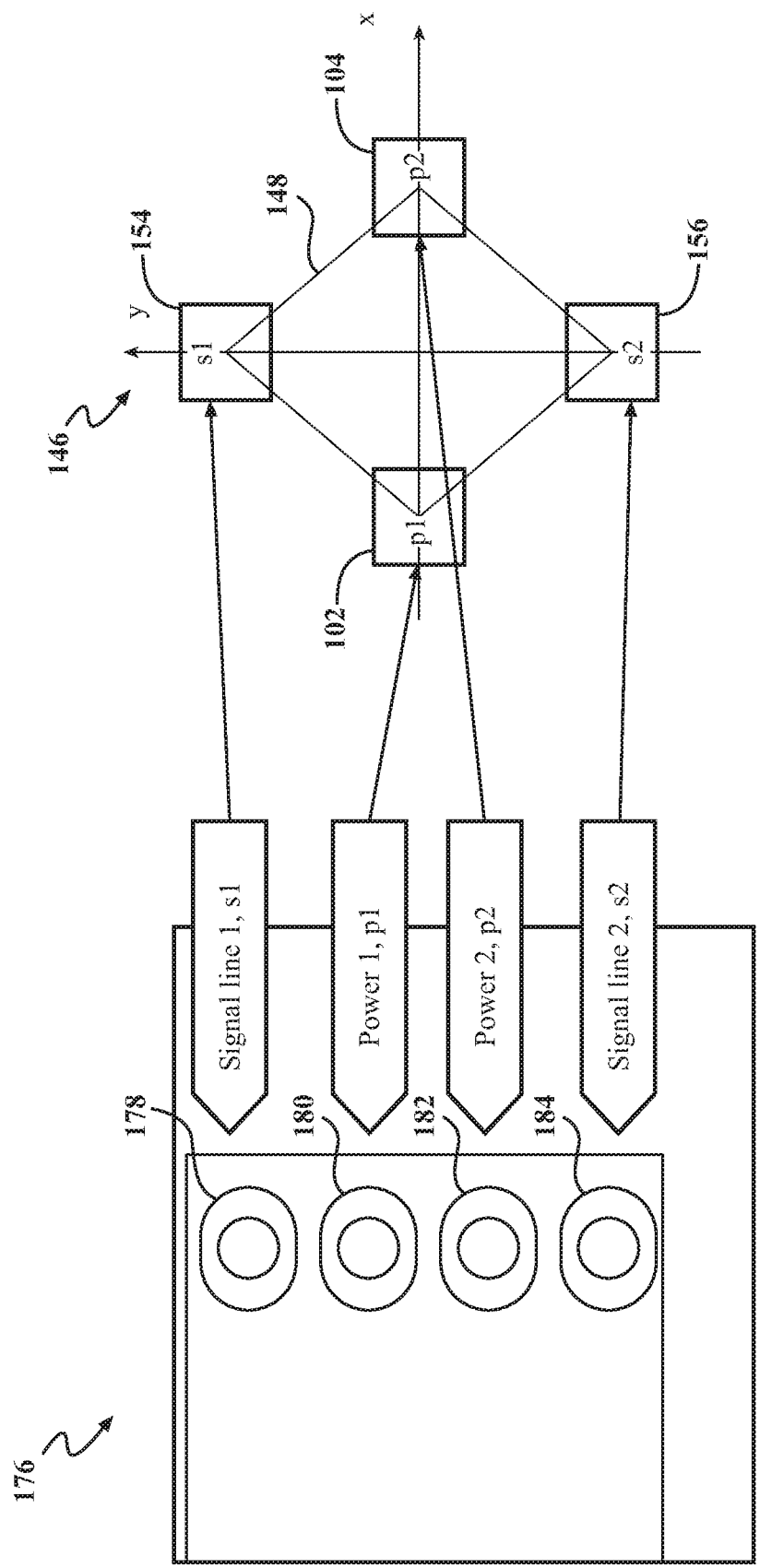
FIG. 10 schematically depicts connector pins layout on the sensor, according to one or more embodiments shown and described herein.

FIG. 10 schematically depicts the layout of the connector pins on a sensor. As illustrated, the rhombus pin diagram 148 of connecting the wires between the sensor 146 to the circuit 176 is met thus the signal decoupling is ensured. As shown, the distance between the two power lines 102, 104 are as close as possible 180, 182 while the distance between the two signal lines 154, 156 is as large as possible 178, 184. Further, the pin layout, while illustrated vertically, may be in any configuration where the signal lines are separated by at least two power lines.

Figure 11:
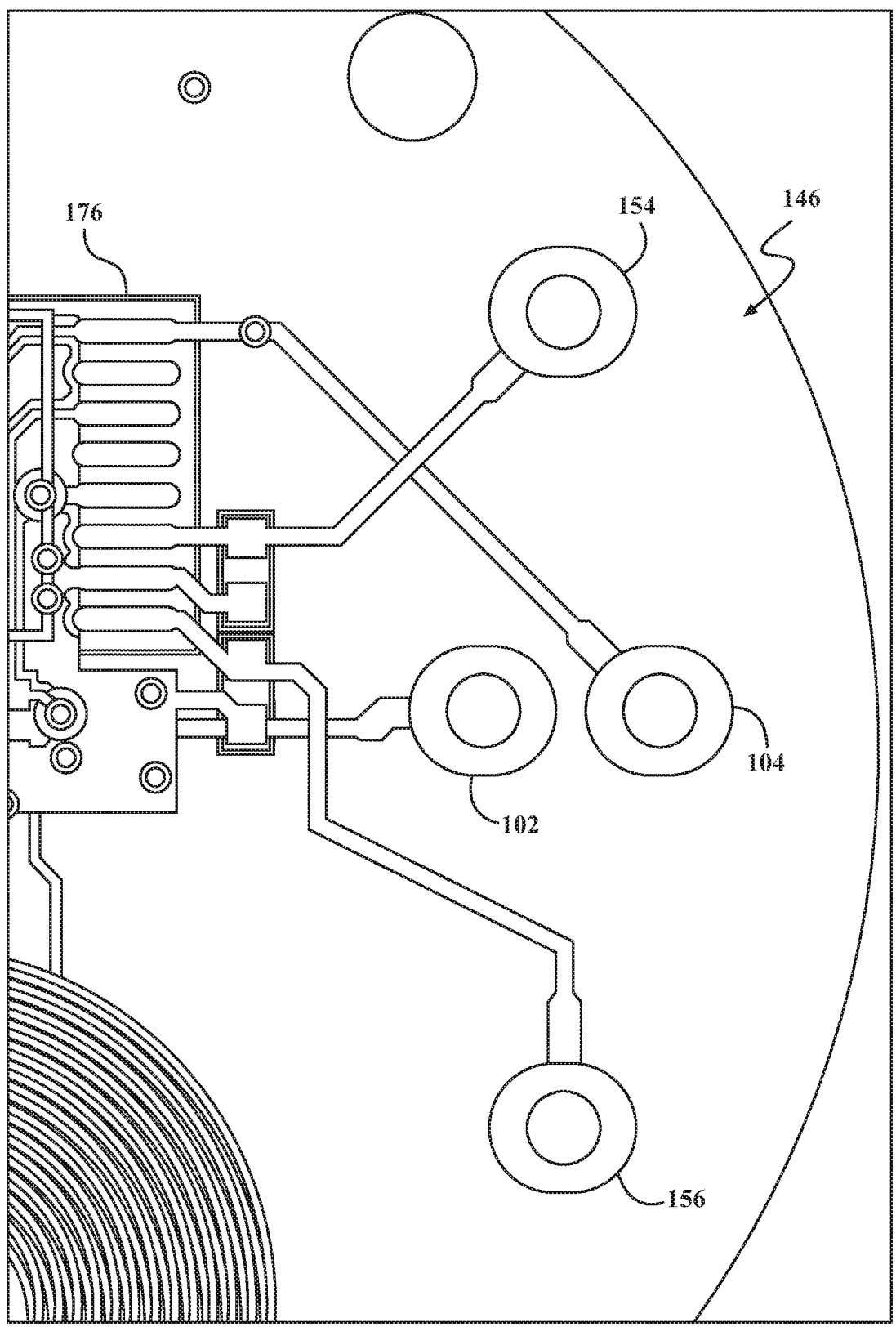
FIG. 11 schematically depicts the circuit layout on the PCB, according to one or more embodiments shown and described herein.

FIG. 11 schematically depicts the tuning pad and driving pin layout of the sensor. The rhombus design 148 is apparent in the sensor layout 146. Again, as shown, the distance between the two power lines 102, 104 are as close as possible while the distance between the two signal lines 154, 156 is as large as possible. Further, the signal lines cross the power lines perpendicularly.

Figure 12:
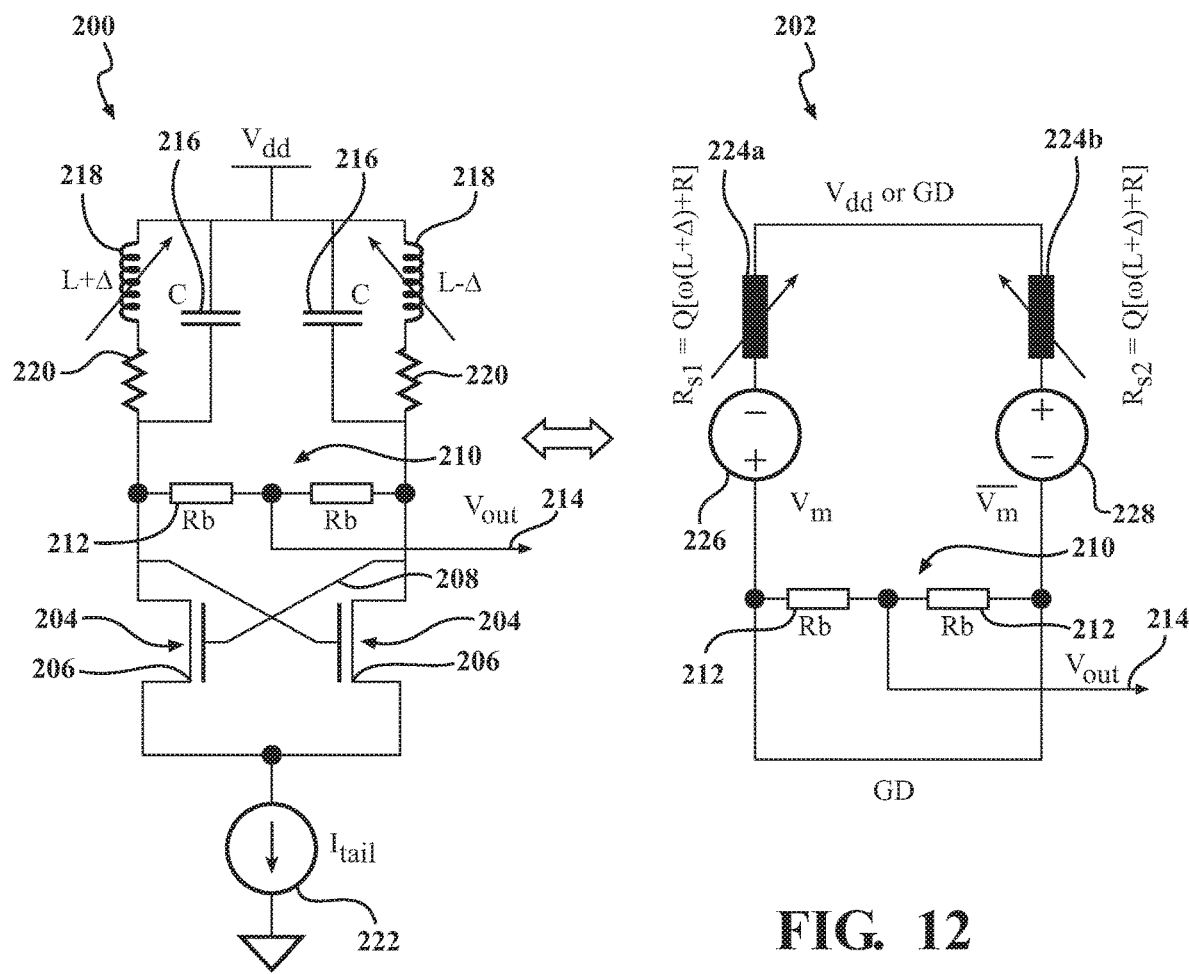
FIG. 12 schematically depicts an LC inductive sensor having a differential LC oscillator and the Thevenin equivalent circuit, according to one or more embodiments shown and described herein.

FIG. 12 schematically illustrates an LC inductive sensor having a differential LC oscillator and the Thevenin equivalent circuit. The LC inductive sensor 200 includes a pair of N-channel transistors 204 having a bridging element 208 between the drains 206. The LC inductive sensor 200 further includes a voltage divider 210 having passive element pair 212 providing for a single differential output 214. Moreover, the LC inductive sensor 200 includes a pair of capacitors 216 where each capacitor is connected in parallel and connected to one of a pair of inductors 218 and resistors 220, where each single inductor 218 and resistor 220 of the pair is in series with each other and the capacitor 216. The tail current 222 sinks with a pair of transistors 204 and with the corresponding drain load 206.

As shown, the Thevenin equivalent 202 is taken from the pair of inductors 218 so that the equivalent source impedance 224a is $R_{s1}=Q[\omega(L+\Delta)+R]$ and equivalent source impedance 224b is $R_{s2}=Q[\omega(L-\Delta)+R]$. Furthermore, the equivalent differential voltage source $V_m$ 226 and the inverse voltage source $V'_m$. 228 with the source impedance and the complementary output strength 214 may be calculated. The Thevenin equivalent 202 transforms the source impedance 224a, 224b multiplied by a factor of Q. Therefore, the circuit acts as an impedance amplifier that multiples the sensing quantity of $\Delta$ in an inductance sensing circuit. The output 210 for the inductance sensing is $$V_{out} = \frac{\Delta}{L} V_m.$$

It should be appreciated that any impedance element of the circuit 200 and equivalent 202 can be amplified by a factor of Q and the LC oscillator may be used as a sensor with a differential signal. It should be appreciated that the Factor Q and I phase have opposite direction currents. Further, it should be appreciated that any small changes on the resistor, capacitor, or inductor are amplified by two times the tail current.

Figure 13:
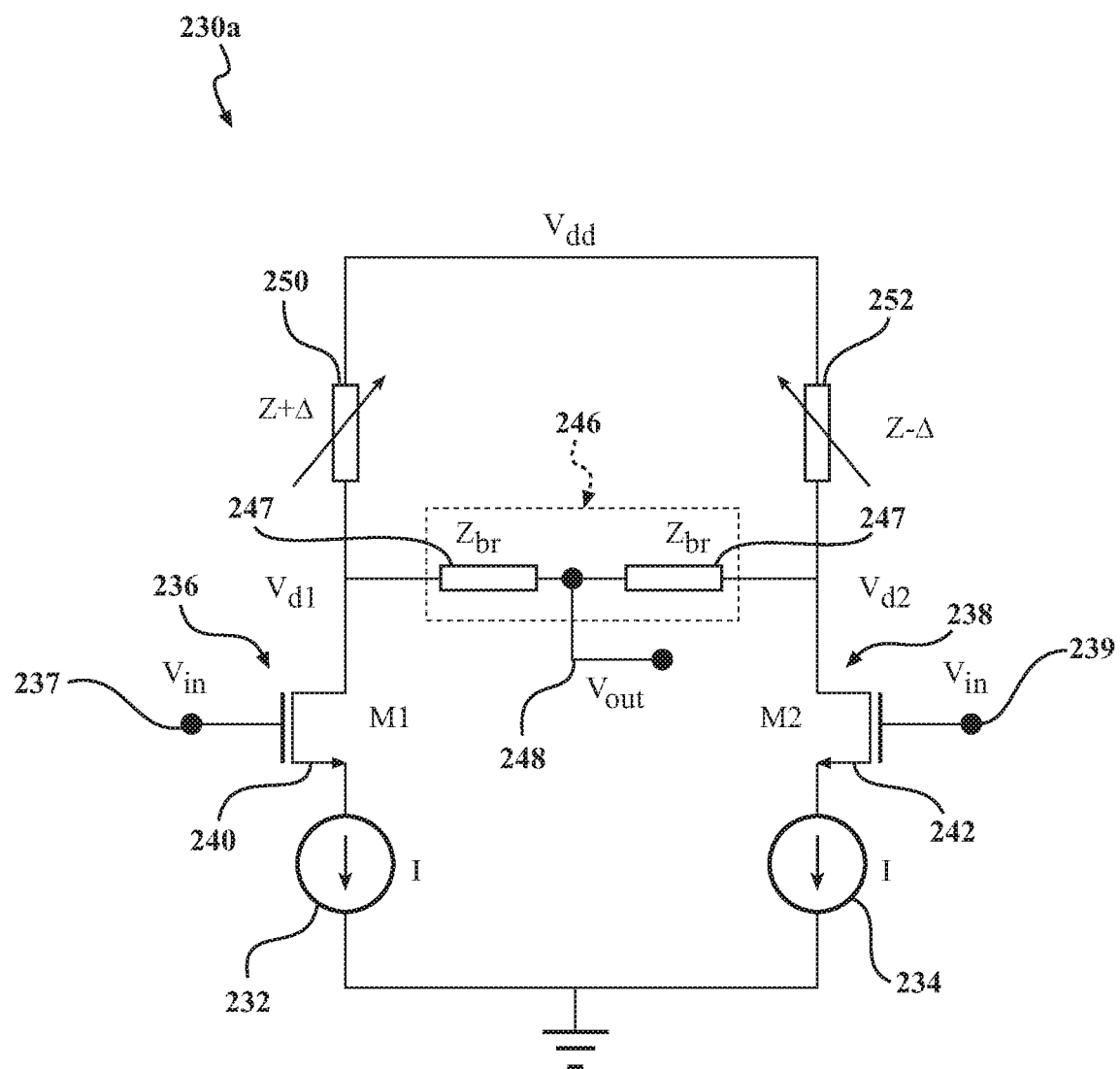
FIG. 13 schematically depicts a current steering bridge circuit having a differential amplifier with current sink to form the bridge circuit, according to one or more embodiments shown and described herein.

FIG. 13 schematically illustrates a current steering bridge circuit 230a having a differential amplifier with current sink to form the bridge circuit. The tail current 232, 234 sinks with a pair of transistors 236, 238 having a corresponding drain load 240, 242. The bridging element between the drains 240, 242 of transistors 236, 238 allows for a differential current between the loads of the drains 240, 242. Because the drains 240, 242 load between the transistors 236, 238, the drain load is balanced, there is not any current passing through the bridge element. However, if there was impedance creating an unbalanced condition on the drain loads, and if the transistors 236, 238 were on, there would be a current flowing through the bridge, which can be sensed.

As a result, by having one drain load remain the same and replacing the other drain load with a sensing element that has a matching impedance to the drain load remaining, such as, without limitation, a capacitive, an inductive, or an electrical sensing elements configured to detect the change in electrical resistance of a semiconductor or a metal under mechanical strain, the steering bridge 230 becomes a sensing circuit.

The steering bridge 230a includes a voltage divider 246 having a pair of bridging impedance elements $Z_{br}$ 247 with an output $V_{out}$ 248 between the impedance elements $Z_{br}$ 247. Moreover, the steering bridge 230 includes impedances $z_{+\Delta}$ 250 and $z_{-\Delta}$ 252. The impedances 250, 252 may be replaced with the bridging impedance elements 247 to become the bridging impedance elements within the voltage divider 246.

Figure 14A:
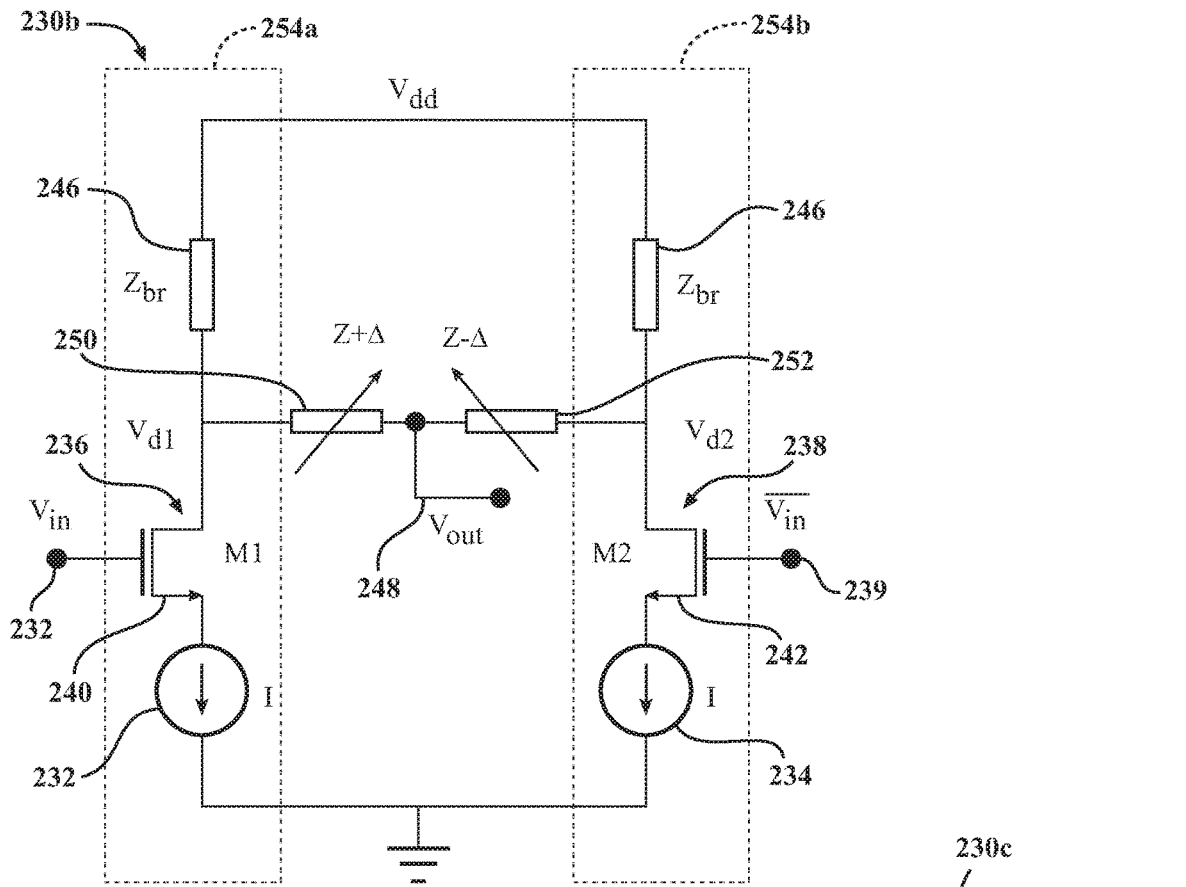
FIG. 14A schematically depicts the steering bridge circuit of a FIG. 13 with the impedances replaced with the bridging impedance elements, according to one or more embodiments shown and described herein.

FIG. 14A schematically illustrates the steering bridge circuit 230a of FIG. 13 with the impedances 250, 252 replaced with the bridging impedance elements 247. The voltage inputs 237, 239 on the transistors 236, 238 are complementary with the current source 232, 234 and the loading impedance elements $Z_{br}$ 247. Therefore, the steering bridge circuit 230b has a similar Thevenin equivalent as discussed in FIG. 12 above. However, in the current steering bridge circuit 230b, the voltage output 248 is significantly weaker because of the voltage divider 246 and bridging impedance elements 247 having a strong impedance (1/gm). Therefore, in sensor applications, the output voltage 248 is a differential and proportional to the difference $\Delta$.

Figure 14B:
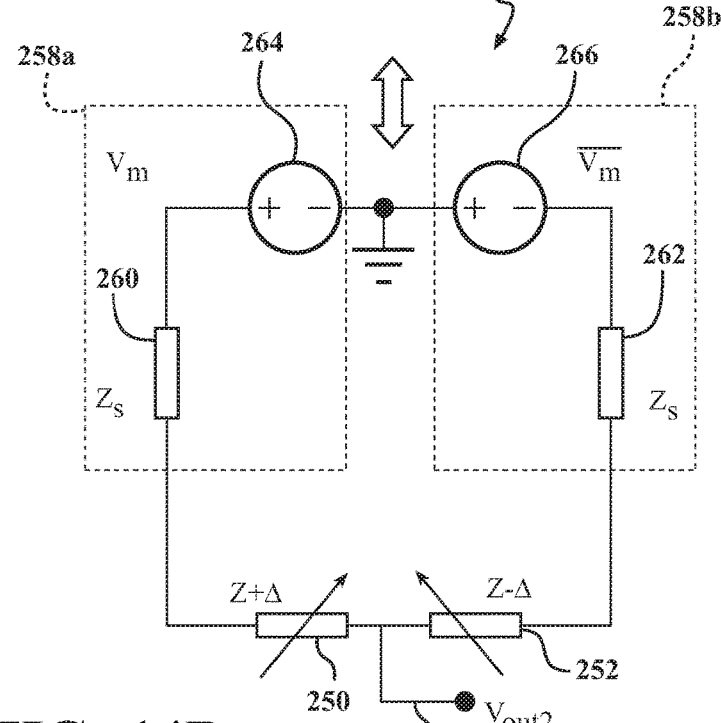
FIG. 14B schematically depicts a Thevenin equivalent current steering bridge circuit of FIG. 14A, according to one or more embodiments shown and described herein.

FIG. 14B schematically illustrates a Thevenin equivalent current steering bridge circuit of FIG. 14A. Under the Thevenin equivalent circuit 230c, the transistor 236, current 232, and impedance 246 of 254a may be combined as an equivalent 258a having a voltage source $V_m$ 264 and a source impedance $Z_s$ 260. Similarly, the transistor 238, current 234, and impedance 246 of 254b may be combined as an equivalent 258b having a voltage source $V'_m$ 266 and a source impedance $Z_s$ 262. As a result, the voltage sources 264, 266 are strong enough so that the source impedances 260, 262 become less than the bridging impedances 250, 252 so that the output voltage 248 may be determined by the equation:

$$V_{out} = \frac{\Delta}{Z_s} V_m$$

where source $V_m$ 264 and source $V'_m$ 266 are a differential amplitude pair of voltage sources.

Figure 15A:
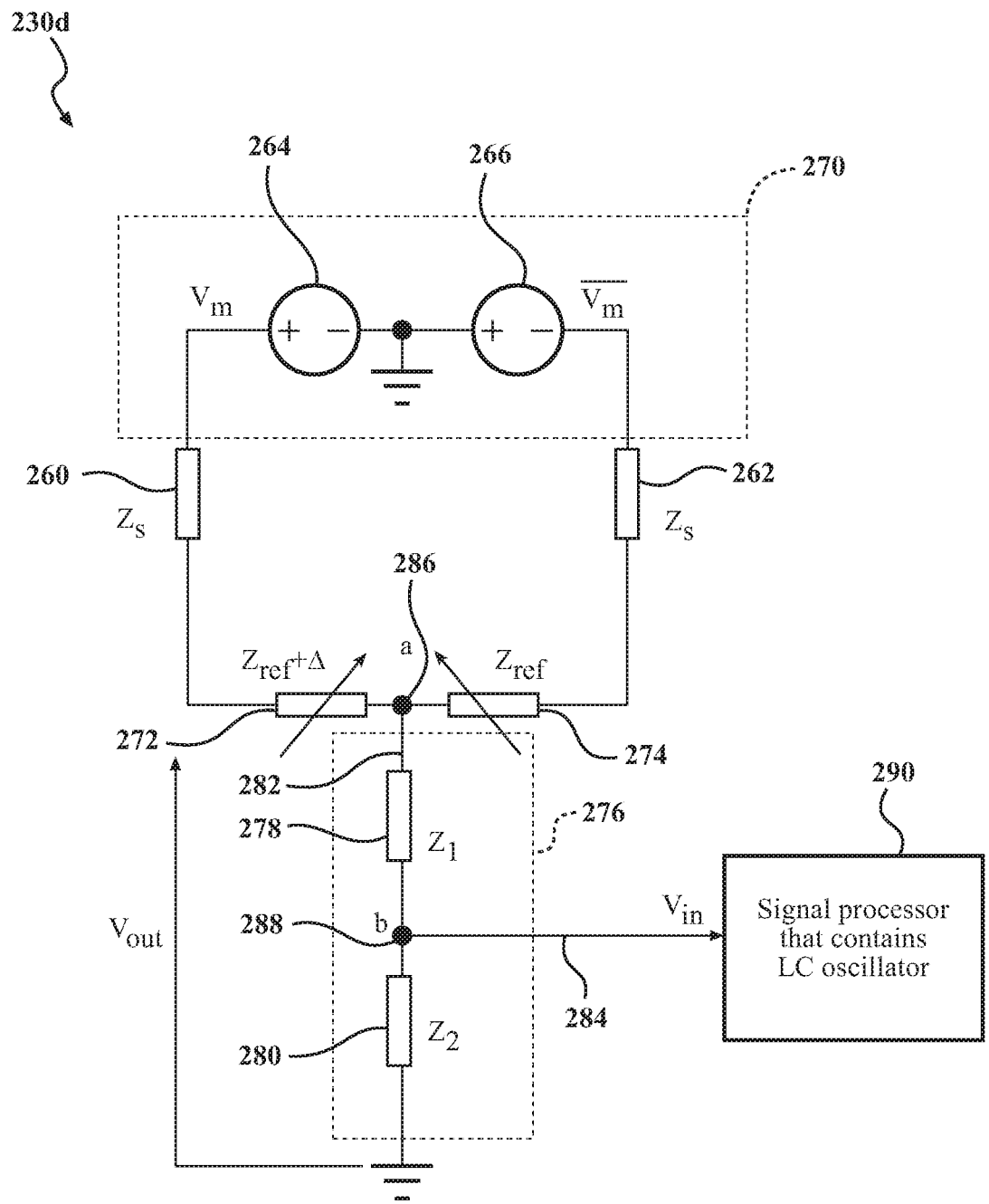
FIG. 15A schematically depicts a differential impedance current steering bridge circuit having a quarter bridge of FIG. 14A, according to one or more embodiments shown and described herein.

FIG. 15A schematically illustrates a differential impedance current steering bridge circuit of FIG. 14A. The current steering bridge circuit 230d is a quarter bridge circuit and includes a differential voltage source 270 which itself includes a pair of voltage source $V_m$ 264 and $V'_m$ 266. The sign convention on the voltage sources 264, 266 indicate the phase of the AC voltages. The source impedances $Z_s$ 260, 262 are connected to the voltage source $V_m$ 264 and voltage source $V'_m$ 266. The differential voltage source 270 drives the bridge which includes an impedance pair at $Z_{ref}+\Delta$ 272 and $Z_{ref}$ 274. The impedance pair 272, 274 are a pair of capacitors but is not limited to capacitors and, as discussed below, may be inductors, resistors and/or other elements. A voltage divider 276 connects to the bridge at node 'a' 286 and includes an impedance pair $Z_1$ 278 and $Z_2$ 280. It should be appreciated that the impedance pair 272, 274 may be a pair of capacitors, inductors, resistors, any combination thereof, and/or other elements.

The differential impedance detects the difference of the impedance pair $\Delta=(Z_{ref+\Delta}-Z_{ref})$. The output 282 at the bridge node 'a' 286 becomes $$v_{out} = \frac{\Delta}{2Z_{ref}+\Delta} V_m$$

when $\Delta$ and source impedances $Z_s$ 260, 262 are small. Additionally, the output voltage 282 of the bridge at node 'a' 286 is too high of a frequency and is typically a delayed signal (lagged in phase) that must be attenuated and the phase needs to be adjusted. As a result, the voltage divider 276 of the current steering bridge 230c acts as a passive network to attenuated and adjust the phase. It should be appreciated that the current steering bridge circuit 230d may be applicable to a variety of sensing elements including capacitive, inductive, or resistive for decoding differential signal. The output 284 of the voltage divider 280 at node 'b' 288 is directed into a signal processor 290 that is configured for an LC oscillator.

Figure 15B:
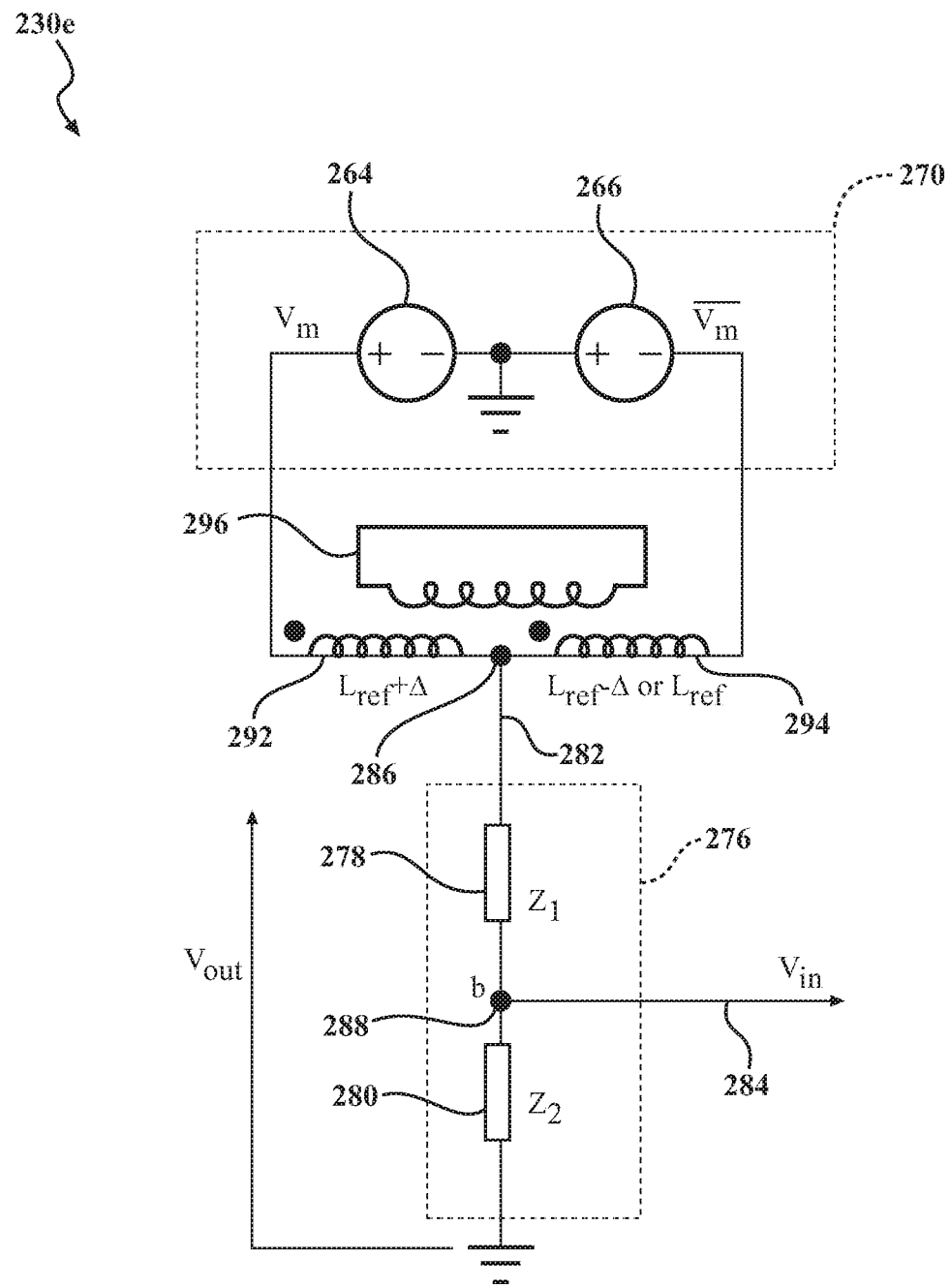
FIG. 15B schematically depicts a differential impedance current steering bridge circuit having a quarter bridge of FIG. 14A, according to one or more embodiments shown and described herein.

FIG. 15B schematically illustrates a differential impedance current steering bridge circuit of FIG. 14A. The current steering bridge circuit 230e includes a differential AC voltage source 270 having a 4 MHz frequency and a $V_m$ amplitude. It should be appreciated that the frequency of the differential voltage source may be greater than or less than 4 MHz. The differential voltage source 270 includes voltage source $V_m$ 264 and voltage source $V'_m$ 266. The sign convention on the voltage sources 264, 266 indicate the phase of the AC voltages.

The differential voltage source 270 drives the bridge, which includes a sensing coil pair at $L_{ref}+\Delta$ 292 and $L_{ref}$ 294. The coil pair 272, 274 is a pair of inductors but is not limited to inductors and, as previously discussed, there may be capacitors, resistors and/or other elements. A coupler 296 is positioned with respect to the sensing coil pair 272, 274 so that the coupler 296 may move along the sensing coil pair 272, 274 so that the position of the coupler is detected by a differential signal generated by the current steering bridge output 282 at the bridge node 'a' 286 where $$v_{out} = \frac{\Delta}{2L_{ref}} V_m.$$

The voltage divider 276 connects to the bridge at node 'a' 286 and includes the impedance pair $Z_1$ 278 and $Z_2$ 280. It should be appreciated that the impedance pair 278, 280 may be a pair of capacitors, inductors, resistors, any combination thereof, and/or other elements. The voltage divider 276 provides the proper attenuated and phase as required by the signal processor.

Figure 16:
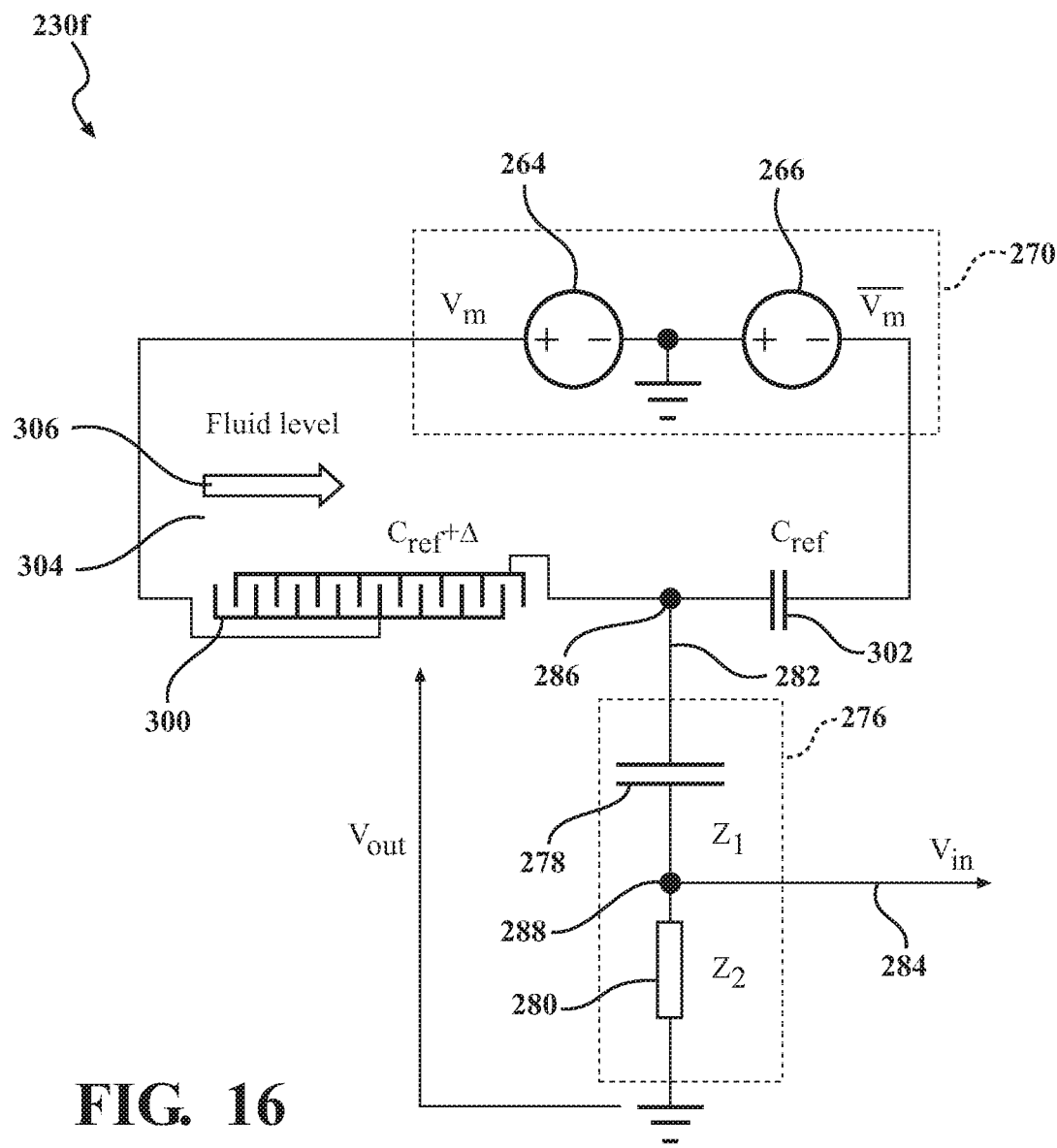
FIG. 16 schematically depicts a differential capacitive current steering bridge circuit having a quarter bridge of FIG. 14A, according to one or more embodiments shown and described herein.

FIG. 16 schematically illustrates a differential capacitive current steering bridge circuit of FIG. 14A. The current steering bridge circuit 230f includes a differential AC voltage source 270 having voltage source $V_m$ 264 and voltage source $V'_m$ 266. The sign convention on the voltage sources 264, 266 indicate the phase of the AC voltages. The differential voltage source 270 drives the bridge which includes a capacitance pair $C_{ref}+\Delta$ 300 and $C_{ref}$ 302. The voltage divider 276 connects to the bridge at node 'a' 286 and includes an impedance pair illustrated as a capacitor $Z_1$ 278 and a second impedance $Z_2$ 280. It should be appreciated that the impedance pair 278, 280 may be a pair of capacitors, inductors, resistors, any combination thereof, and/or other elements.

The capacitor $C_{ref}+\Delta$ 300 may be printed on a PCB board and is in contact with a fluid 304. As the fluid 304 rises in the direction 306, the fluid 304 moves along the sensing electrode pair so that the level of the fluid 304 detected by the differential signal output 282 due to the capacitance change $\Delta$ varying with the level of the fluid 304 in contact with the capacitor 300 at the bridge node 'a' 286 where $$v_{out} = \frac{-\Delta}{2C_{ref}} V_m.$$

The voltage divider 276 provides the proper attenuated and phase as required by the signal processor.

It should be appreciated that that the capacitor $C_{ref}+\Delta$ 300 may be replaced by a discrete component and the steering bridge circuit will behave 230f in the same manner by using the level of the fluid 304 moving along the sensing electrode pair so that the level of the fluid 304 detected by the differential signal output 282 due to the change $\Delta$ varying with the level of the fluid 304.

As a result of the present embodiment operating at a frequency of 4 MHz, it will be appreciated by one skilled in the art that this is an advantage over conventional capacitive sensors designs. The present embodiment is nearly 400 times higher frequency than conventional capacitive sensors, therefore the source impedance becomes 400 times lower than conventional capacitive sensors. Therefore, the present embodiment capacitive sensor has considerably better noise performance.

It should be appreciated that the above embodiments are not limited to the differential voltage sources as described above. In a non-limiting example, an LC oscillator circuit with a center tap may be transformed to a differential voltage source having a transformed series resistance R and phasor $V_m$. The equivalent source impedance $R_s$ becomes Q times R of the original circuit, and the $V_m$ can be evaluated from Q and tank impedance.

Furthermore, if the inductor does not have a center tap for powering, but has a pair of identical resistor for powering the circuit, the circuit function will be nearly identical as of the circuit with center tapped inductor, however there will be a lower voltage swing due to the loss of Q, quality factor for the powering resistor pair. This differential voltage source structure is advantageous because it provides a calibration for proper balancing of the differential voltage pair of $V_m$ and $V'_m$ using the trimming of the pair of powering resistors, which is inherently easier than using an inductor. Moreover, this differential voltage source structure is advantageous because in certain applications, the average voltage of $V_{out}$ can be lowered to eliminate the bias voltage of downstream of the circuit, such that when the sensing element is a conductive element.

Figure 17A:
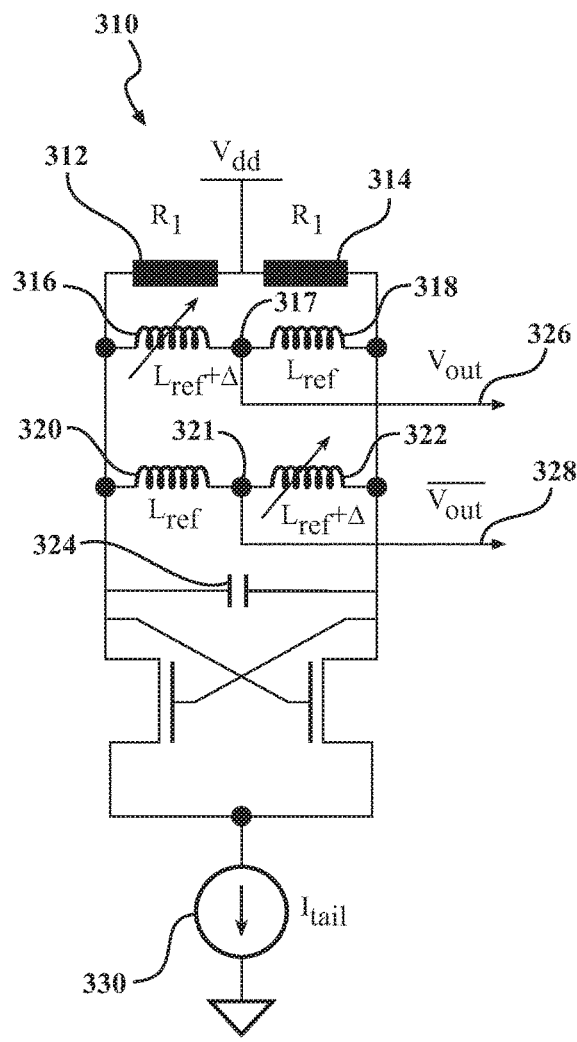
FIG. 17A schematically depicts a differential inductive current steering bridge circuit without a center tap having two variable inductors, according to one or more embodiments shown and described herein.

FIG. 17A schematically illustrates a differential inductive current steering bridge circuit without a center tap having two variable inductors. Current steering bridge circuit 310 includes a pair of resistors 312, 314, a capacitor 324, a tail current 330, and two bridges. The upper most bridge having node 317 separating a first inductor pair 316, 318 with the inductor 316 having the delta change. The first output $V_{out}$ 326 is taken from the first node 317. The next bridge having node 321 separating a second inductor pair 320, 322 with the inductor 322 having the delta change. The second output $V'_{out}$ 328 is taken from the second node 321.

Therefore, the current steering bridge circuit 310 is an LC circuit without a center tap and has more than one set of sensing coils. The sensing coils may be separated because the inductance of a resonator has a dual function. First as a resonator coil, and second, as a sensing coil when modulated with an eddy plate. In other words, the output $V_{out}$ 326 may be taken from the bridge 317 between the pair of sensing coils 316, 318 and the output $V'_{out}$ 328 may be taken from the bridge 321 between two separate and distinct sensing coils 320, 322, As a result of this structure, it is possible to use one LC oscillator 310 in more than one reservoir or tank.

Figure 17B:
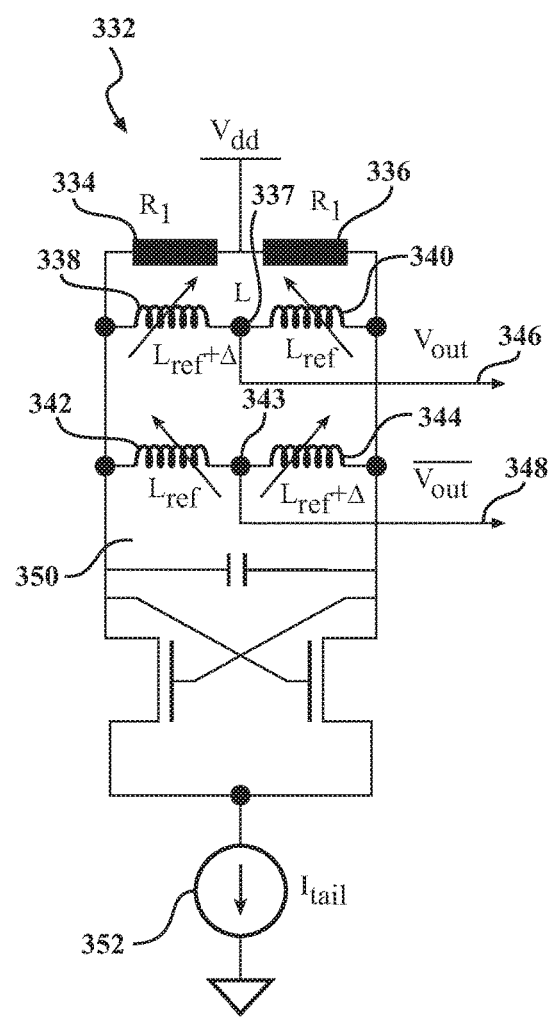
FIG. 17B schematically depicts a differential inductive current steering bridge circuit without a center tap having four variable inductors, according to one or more embodiments shown and described herein.

FIG. 17B schematically illustrates a differential inductive current steering bridge circuit without a center tap having four variable inductors. Current steering bridge circuit 332 includes a pair of resistors 334, 336, a capacitor 350, a tail current 352, and two bridges. The upper most bridge having node 339 separating a first inductor pair 338, 340. Both the of the pair of inductors 338, 340 are variable but the first inductor 338 of the pair has the delta change. The first output $V_{out}$ 346 is taken from the first node 339.

The next bridge has node 343 separating a second inductor pair 342, 344. Both the of the pair of inductors 342, 344 are variable but the second inductor 344 of the pair has the delta change. The second output $V'_{out}$ 348 is taken from the second node 343.

Therefore, the current steering bridge circuit 332 has the two LC oscillators that is configured to generate two outputs from two different reservoirs or tanks.

As discussed above, while the LC circuit differential voltage source structure without a center tap may be used in quarter bridges, this structure may also be used on half and full bridge structures.

Figure 18:
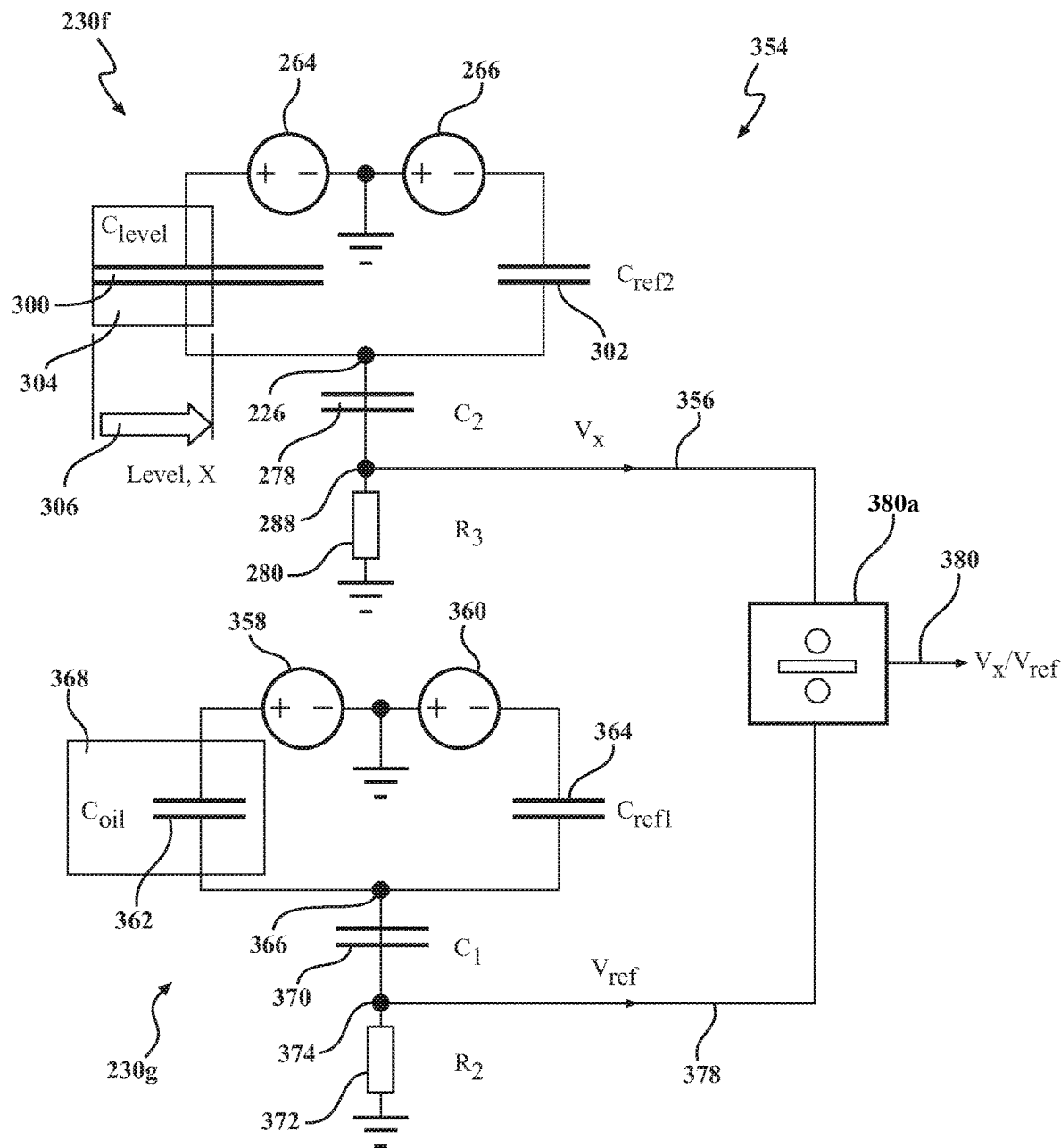
FIG. 18 schematically depicts a ratio-metric output of differential capacitive current steering bridge circuit, according to one or more embodiments shown and described herein.

Now referring to FIG. 18 which schematically illustrates a ratio-metric output of differential capacitive current steering bridge circuit and FIG. 16 differential capacitive current steering bridge circuit 230f. The current steering bridge circuit 354 includes circuit 230f and circuit 230g. The current steering bridge circuit 230g includes a differential AC voltage source having voltage source $V_m$ 358 and voltage source 360. The sign convention on the voltage sources 358, 360 indicate the phase of the AC voltages. The differential voltage source drives the bridge which includes a capacitance pair $C_{oil}$ 362 and $C_{ref1}$ 364. The voltage divider connects to the bridge at node 366 and includes an impedance pair illustrated as a capacitor $C_1$ 370 and a second impedance $Z_2$ 372. It should be appreciated that the impedance pair 370, 372 may be a pair of capacitors, inductors, resistors, any combination thereof, and/or other elements.

The capacitor $C_{oil}$ 362 may be printed on a PCB board and is submerged into a fluid 368. The output $V_{ref}$ 378 is taken from the voltage divider node 374.

In this embodiment, a ratio-metric output 380 may be generated by a divider 380a by taking the ratio of the output $V_x$ 356 of the differential capacitive current steering bridge circuit 230f and dividing by the output 378 of the differential capacitive current steering bridge circuit 230g. The output $V_x$ 356 measures the fluid level 304 while the output $V_{ref}$ 378 generates the reference capacitance value. The electrodes of the Coil capacitor 362 are generally always submerged in a fluid 368. By determining a ratio between the output 356 and output 378, the fluid type, temperature, common noise and electromagnetic interference are now disregarded.

Therefore, according to the present embodiments described above, noise reduction in inductive sensing is completed in one of two ways, through the RF frequency operation of the sensor board or through ratio-metric processing of the two output signals.

According to the above disclosure, the capacitive sensing mechanism of the present inventions utilize ratio metric and differential concepts in order to cancel most variation associated with unintended influences, the differential structure to sensing element further eliminating most common mode influences. Additional considerations include a ratio of the two signals generated being presented in order to further reduce common mode influence. The use of the LC type drive mechanism further allows for noise immunity as well as low emissions from the drive harmonic.

It should be appreciated that an inductive sensor with LC oscillator can be used as part of the current steering bridge pair of a capacitive sensor, which finds its application for detecting fluid level, fluid quality, acceleration, humidity, pressure, or some gas intensity, when a proper impedance, capacitance variation is detectable with respect to the intensity of the gas or level of any fluid. Moreover, an LC inductive circuit has a good differential voltage source to drive the bridges or modified bridges as shown to measure the quantities in ratio-metric way to compensate temperature, electromagnetic interface, or mechanical variation of the sensor device.

Further, it should be appreciated that discrete components may replace any of the components described above including, without limitation, capacitors, inductors, or resistors.

Having described my invention, other and additional preferred embodiments will become apparent to those skilled in the art to which it pertains, and without deviating from the scope of the appended claims.

The invention claimed is:

1. A system for determining a level of a fluid in a reservoir, the system comprising:
   a processor chip;
   a circuit board communicatively coupled to the processor chip;
   a first differential voltage source;
   a first current steering bridge having a first pair of bridging passive elements to generate a first differential signal, the first differential voltage source drives the first current steering bridge; and
   a first voltage divider coupled between the first pair of bridging passive elements and coupled in series with the first current steering bridge, the first differential signal is input into the first voltage divider, the first voltage divider is configured to output a first output signal to the processor chip, wherein the first output signal is a measurement that corresponds to the level of the fluid in contact with the first current steering bridge.

2. The system of claim 1, wherein the system is integrated into an inductor capacitor oscillator of the processor chip, the oscillator produces a radio frequency oscillation.

3. The system of claim 2, wherein at least one of the first pair of bridging passive elements is in communication with the circuit board, the circuit board is in fluid communication with the fluid.

4. The system of claim 3, wherein the first pair of bridging passive elements to generate the first differential signal are capacitors, the first differential signal is a differential capacitance measurement that corresponds to the level of the fluid in contact with the first current steering bridge.

5. The system of claim 3, wherein the first pair of bridging passive elements to generate the first differential signal are resistors, the first differential signal is a differential impedance measurement that corresponds to the level of the fluid in contact with the first current steering bridge.

6. The system of claim 3, wherein the first pair of bridging passive elements to generate the first differential signal are inductors, the first differential signal is a differential inductance measurement that corresponds to the level of the fluid in contact with the first current steering bridge.

7. The system of claim 3, further comprising:
a second differential voltage source having a second pair of voltage sources;
a second current steering bridge having a second pair of bridging passive elements to generate a second differential signal, the second differential voltage source drives the second current steering bridge; and
a second voltage divider coupled between the second pair of bridging passive elements and coupled in series with the second current steering bridge, the second differential signal is input into the second voltage divider, the second voltage divider is configured to output a second output signal to the processor chip,
wherein the second output signal is a second measurement that corresponds to a reference value.

8. The system of claim 7, wherein the first differential signal and the second differential signal are connected to a divider, the divider providing a ratio-metric output, the ratio-metric output is independent from a fluid type, a temperature, an electromagnetic interference, and common mode noise.

9. The system of claim 8, wherein the system is integrated into an oscillator of the processor chip, the oscillator produces a radio frequency oscillation and an operating frequency of the system is a 4 megahertz exciting signal.

10. The system of claim 9, wherein a noise reduction occurs through the radio frequency oscillation and the ratio-metric output.

11. The system of claim 7, wherein at least one of the second pair of bridging passive elements is in communication with the circuit board, the circuit board is in fluid communication with the fluid.

12. The system of claim 11, wherein the second pair of bridging passive elements to generate the second differential signal are capacitors, the second differential signal is a differential capacitance measurement that corresponds to the level of fluid in contact with the second current steering bridge.

13. The system of claim 11, wherein the second pair of bridging passive elements to generate the second differential signal are resistors, the second differential signal is a differential impedance measurement that corresponds to the level of the fluid in contact with the second current steering bridge.

14. The system of claim 11, wherein the second pair of bridging passive elements to generate the second differential signal are inductors, the second differential signal is a differential inductance measurement that corresponds to the level of the fluid in contact with the second current steering bridge.

15. The system of claim 7, wherein the first current steering bridge is one from a quarter bridge, a half bridge, and a full bridge and the second current steering bridge is one from a quarter bridge, a half bridge, and a full bridge.

16. The system of claim 7, wherein at least one of the second pair of bridging passive elements is in fluid communication with a second fluid in a second reservoir.

17. A system for determining a level of a fluid in a reservoir, the system comprising:
a processor chip;
a circuit board communicatively coupled to the processor chip;
a first differential voltage source having a pair of voltage sources;
a first current steering bridge having a first pair of bridging passive elements, the first differential voltage source drives the first current steering bridge to generate a first differential signal;
a first voltage divider coupled between the first pair of bridging passive elements and coupled in series with the first current steering bridge, the first differential signal is input into the first voltage divider, the first voltage divider is configured to output the first differential signal to the processor chip;
a second-differential voltage source;
a second current steering bridge having a second pair of bridging passive elements, the second differential voltage source drives the second current steering bridge to generate a second differential signal, and
a second voltage divider coupled between the second pair of bridging passive elements and coupled in series with the second current steering bridge, the second differential signal is input into the second voltage divider, the second voltage divider configured to output the second differential signal to the processor chip,
wherein the at least one of the first pair of bridging passive elements or the at least one of the second pair of bridging passive elements are in communication with the circuit board, the circuit board is in fluid communication with the fluid,
wherein the first differential signal is a first measurement that corresponds to the level of the fluid in contact with the first current steering bridge, the second differential signal is a second measurement that corresponds to a reference value, and
wherein the first measurement and the second measurement are connected to a divider, the divider providing a ratio-metric output, the ratio-metric output is independent from a fluid type, a temperature, an electromagnetic interference, and common mode noise.

18. The system of claim 17, wherein the first pair of bridging passive elements are a combination from the group of capacitors, inductors, and resistors and the second pair of bridging passive elements are a combination from the group of capacitors, inductors, and resistors.

19. The system of claim 17, wherein the reference value corresponds to a second fluid in a second reservoir.

\* \* \* \* \*